(12) United States Patent
Kim

(10) Patent No.: US 9,668,251 B2
(45) Date of Patent: May 30, 2017

(54) METHOD AND APPARATUS FOR TRANSMISSION OF SIGNAL FROM DEVICE TO DEVICE IN A WIRELESS COMMUNICATION SYSTEM

(75) Inventor: Hakseong Kim, Anyang-si (KR)

(73) Assignee: LG Electronics Inc., Seoul (KR)

( * ) Notice: Subject to any disclaimer, the term of this patent is extended or adjusted under 35 U.S.C. 154(b) by 102 days.

(21) Appl. No.: 14/110,730

(22) PCT Filed: Apr. 20, 2012

(86) PCT No.: PCT/KR2012/003033
§ 371 (c)(1),
(2), (4) Date: Oct. 9, 2013

(87) PCT Pub. No.: WO2012/144839
PCT Pub. Date: Oct. 26, 2012

(65) Prior Publication Data
US 2014/0029560 A1    Jan. 30, 2014

Related U.S. Application Data

(60) Provisional application No. 61/477,167, filed on Apr. 20, 2011, provisional application No. 61/494,420, filed on Jun. 8, 2011.

(51) Int. Cl.
*H04W 4/00* (2009.01)
*H04W 72/04* (2009.01)
(Continued)

(52) U.S. Cl.
CPC ........... *H04W 72/042* (2013.01); *H04L 5/001* (2013.01); *H04L 5/0053* (2013.01);
(Continued)

(58) Field of Classification Search
CPC ............. H04W 56/0015; H04W 56/00; H04W 56/001; H04W 56/002; H04W 76/023;
(Continued)

(56) References Cited

U.S. PATENT DOCUMENTS

2009/0034447 A1  2/2009 Yu et al.
2009/0209260 A1  8/2009 Lee et al.
(Continued)

FOREIGN PATENT DOCUMENTS

KR  10-2009-0013953 A  2/2009
KR  10-2009-0089993 A  8/2009
(Continued)

*Primary Examiner* — Joshua Kading
*Assistant Examiner* — Atique Ahmed
(74) *Attorney, Agent, or Firm* — Birch, Stewart, Kolasch & Birch, LLP

(57) ABSTRACT

One embodiment of the present invention relates to a method for transmitting signals from a first terminal to a second terminal in a wireless communication system, which comprises the steps of: requesting a base station for connection to a second terminal; receiving control information concerning the request from the base station; transmitting a preamble to the second terminal using the control information; and receiving a response concerning the transmission of the preamble from the second terminal, wherein the preamble is transmitted to obtain a synchronized uplink for the second terminal.

15 Claims, 18 Drawing Sheets

(51) Int. Cl.
*H04L 5/00* (2006.01)
*H04W 56/00* (2009.01)

(52) U.S. Cl.
CPC ....... *H04L 5/0091* (2013.01); *H04W 56/0045* (2013.01); *H04L 5/0023* (2013.01); *H04W 56/002* (2013.01)

(58) Field of Classification Search
CPC .. H04W 72/04; H04W 72/042; H04L 5/0053; H04L 5/001; H04L 5/0023
USPC ................................. 370/329, 355; 714/807
See application file for complete search history.

(56) References Cited

U.S. PATENT DOCUMENTS

| | | | |
|---|---|---|---|
| 2010/0167743 A1* | 7/2010 | Palanki et al. ................ | 455/436 |
| 2011/0083066 A1* | 4/2011 | Chung .................. | H03M 13/09 |
| | | | 714/807 |
| 2011/0182280 A1* | 7/2011 | Charbit ............. | H04W 56/0045 |
| | | | 370/350 |
| 2012/0039256 A1 | 2/2012 | Kwon et al. | |
| 2012/0163235 A1* | 6/2012 | Ho ...................... | H04W 76/023 |
| | | | 370/254 |
| 2013/0329711 A1* | 12/2013 | Seo et al. ...................... | 370/336 |

FOREIGN PATENT DOCUMENTS

WO    WO 2010/078271 A2    7/2010
WO    WO 2010/120088 A2    10/2010

\* cited by examiner

FIG. 5
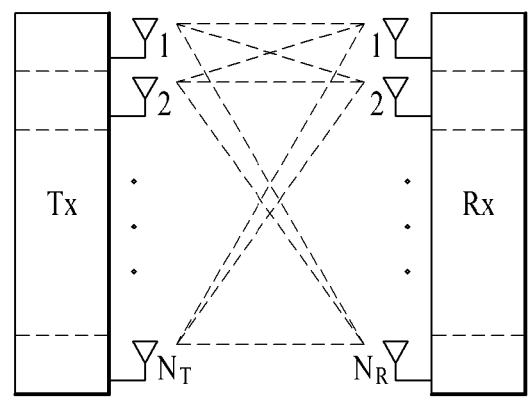
(a)
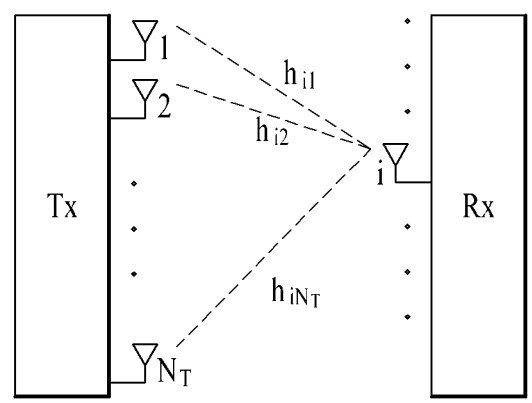
(b)

FIG. 17

(a) DCI Format 1A: | CIF (3) | 0/1A | L/D | RA (Variable) | MCS (5) | HARQ (3) | NDI | RV (2) | TPC (2) | ZP |

(b) PDCCH P-to-P CMD: CIF (3) | 0/1A | 0 | ............1............ | (Preamble), PRACH Mask Index, UEID, MCS, (NDI)

(c) PDCCH P-to-P CMD: CIF (3) | 0/1A | 0 | ............1............ | (Preamble), UE ID, MCS, RA, (NDI)

(d) PDCCH P-to-P CMD: CIF (3) | 0/1A | 0 | ............1............ | (Preamble), UE ID, MCS, RA, (NDI)

(e) PDCCH P-to-P CMD: CIF (3) | 0/1A | 0 | ............1............ | (Preamble), UE ID, (NDI)

(f) PDCCH P-to-P CMD: CIF (3) | 0/1A | 0 | ............1............ | UE ID, MCS, RA, (NDI)

METHOD AND APPARATUS FOR TRANSMISSION OF SIGNAL FROM DEVICE TO DEVICE IN A WIRELESS COMMUNICATION SYSTEM

CROSS REFERENCE TO RELATED APPLICATIONS

This application is the National Phase of PCT/KR2012/003033 filed on Apr. 20, 2012, which claims priority under 35 U.S.C. §119(e) to U.S. Provisional Application No. 61/477,167 filed on Apr. 20, 2011, and U.S. Provisional Application No. 61/494,420 filed on Jun. 8, 2011, all of which are hereby expressly incorporated by reference into the present application.

TECHNICAL FIELD

Following descriptions relate to a method of transmitting a signal of a device-to-device in a wireless communication system and apparatus therefor.

BACKGROUND ART

A wireless communication system is developing to diversely cover a wide range to provide such a communication service as an audio communication service, a data communication service and the like. The wireless communication is a sort of a multiple access system capable of supporting communications with multiple users by sharing available system resources (e.g., bandwidth, transmit power, etc.). For example, the multiple access system may include one of CDMA (code division multiple access) system, FDMA (frequency division multiple access) system, TDMA (time division multiple access) system, OFDMA (orthogonal frequency division multiple access) system, SC-FDMA (single carrier frequency division multiple access) system, MC-FDMA (multi carrier frequency division multiple access) system and the like.

DISCLOSURE OF THE INVENTION

Technical Task

The present invention relates to a method of transmitting a signal of a device-to-device and apparatus therefor.

Technical tasks obtainable from the present invention are non-limited the above-mentioned technical task. And, other unmentioned technical tasks can be clearly understood from the following description by those having ordinary skill in the technical field to which the present invention pertains.

Technical Solution

According to a first technical solution of the present invention, a method of transmitting a signal to a second user equipment, which is transmitted by a first user equipment in a wireless communication system, includes the steps of making a request for accessing the second user equipment to an eNode B, receiving a control information on the request from the eNode B, transmitting a preamble to the second user equipment using the control information, and receiving a response from the second user equipment in response to the preamble, wherein the preamble is transmitted to obtain an uplink synchronization of the second user equipment.

According to a second technical solution of the present invention, a method of receiving a signal from a first user equipment, which is received by a second user equipment in a wireless communication system, includes the steps of receiving a preamble transmitted by a first user equipment, which made a request for accessing the second user equipment to an eNode B and received a control information and transmitting a response to the first user equipment in response to the preamble, wherein the preamble is transmitted to the second user equipment to obtain an uplink synchronization of the second user equipment by the first user equipment.

According to a third technical solution of the present invention, an eNode B in a wireless communication includes a transmission module and a processor, the processor configured to receive a request for accessing a second user equipment from a first user equipment, the processor configured to transmit a control information on the access request, wherein the control information is used for the first user equipment to transmit a preamble to the second user equipment and wherein the preamble is configured for the first user equipment to obtain an uplink synchronization of the second user equipment.

According to a fourth technical solution of the present invention, a user equipment transmitting a signal to a second user equipment in a wireless communication system includes a transmission module and a processor, the processor configured to make a request for accessing the second user equipment to an eNode B, the processor configured to receive a control information on the request from the eNode B, the processor configured to transmit a preamble to the second user equipment using the control information, the processor configured to receive a response from the second user equipment in response to the transmitted preamble, wherein the preamble is transmitted to obtain an uplink synchronization of the second user equipment.

According to a fifth technical solution of the present invention, a user equipment receiving a signal from a first user equipment in a wireless communication system includes a reception module and a processor, the processor configured to make a request for accessing a second user equipment to an eNode B, the processor configured to receive a preamble transmitted by the first user equipment, which has received a control information, the processor configured to transmit a response to the first user equipment in response to the preamble, wherein the preamble is transmitted by the first user equipment to obtain an uplink synchronization of the second user equipment.

The first to the fifth technical solution of the present invention can include all or a part of the following description.

The method further includes the step of transmitting a reception confirmation response to the second user equipment in response to the response and the first user equipment can transmit a preamble to the second user equipment to obtain the uplink synchronization of the second user equipment again when the reception confirmation response is transmitted to the second user equipment.

The method further include the step of transmitting a reception confirmation response to the second user equipment in response to the response and if mobility of the first user equipment is greater than a pre-set value, a preamble configured to obtain the uplink synchronization of the second user equipment again can be transmitted together with the reception confirmation response when the reception confirmation response is transmitted to the second user equipment.

The control information is transmitted on a physical downlink control channel (PDCCH) and the PDCCH can include a downlink control information configured to indicate the first user equipment to transmit the preamble.

The downlink control information can include at least one selected from the group consisting of an uplink resource allocation, a modulation and coding rate, an identifier of the second user equipment. In this case, the downlink control information further includes a virtual resource block assignment indicator field and a resource block assignment field. The virtual resource block assignment field is set to 0, and the resource block assignment field is set to identical contiguous bits.

The access request can include an identifier of the second user equipment.

When the first user equipment receives the control information, the second user equipment can receive control information including uplink resource allocation information on the first user equipment from the eNode B.

The preamble may correspond to a random access preamble.

The first user equipment can transmit a data together with the preamble to the second user equipment when the preamble is transmitted to the second user equipment.

The response can include a reception confirmation response in response to the transmitted preamble and a preamble transmitted by the second user equipment to obtain an uplink synchronization of the first user equipment.

The response can include a data transmitted to the first user equipment by the second user equipment.

Advantageous Effects

According to the present invention, it is able to efficiently manage a device-to-device communication.

Effects obtainable from the present invention may be non-limited by the above mentioned effect. And, other unmentioned effects can be clearly understood from the following description by those having ordinary skill in the technical field to which the present invention pertains.

DESCRIPTION OF DRAWINGS

FIG. 5 is a diagram of a wireless communication system having a multi antenna;

FIG. 17 is a diagram for explaining downlink (DL) control information applied to one embodiment of the present invention;

BEST MODE

Mode for Invention

Figure 1:
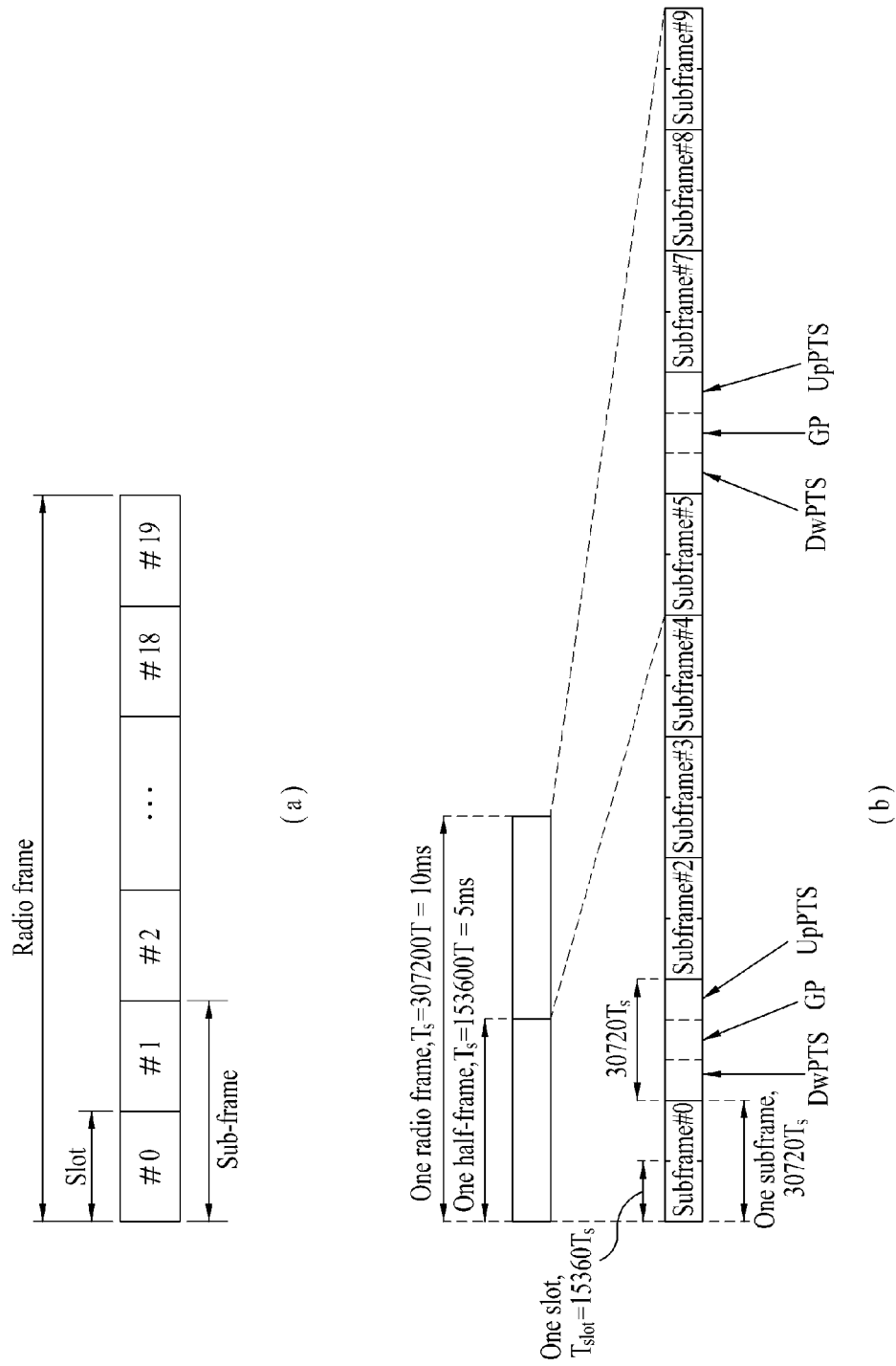
FIG. 1 is a diagram of a structure of a radio frame.

The following embodiments may correspond to combinations of elements and features of the present invention in prescribed forms. And, it may be able to consider that the respective elements or features may be selective unless they are explicitly mentioned. Each of the elements or features may be implemented in a form failing to be combined with other elements or features. Moreover, it may be able to implement an embodiment of the present invention by combining elements and/or features together in part. A sequence of operations explained for each embodiment of the present invention may be modified. Some configurations or features of one embodiment may be included in another embodiment or can be substituted for corresponding configurations or features of another embodiment.

In this specification, embodiments of the present invention are described centering on the data transmission/reception relations between an eNode B and a user equipment. In this case, an eNode B has a meaning of a terminal node of a network directly communicating with a user equipment. In this disclosure, a specific operation explained as performed by an eNode B may be performed by an upper node of the eNode B in some cases.

In particular, in a network constructed with a plurality of network nodes including an eNode B, it is apparent that various operations performed for communication with a user equipment can be performed by an eNode B or other network nodes except the eNode B. 'Base station (BS)' may be substituted with such a terminology as a fixed station, a Node B, an eNode B (eNB), an access point (AP) and the like. A relay may be substituted with such a terminology as a relay node (RN), a relay station (RS), and the like. And, 'terminal' may be substituted with such a terminology as a user equipment (UE), an MS (mobile station), an MSS (mobile subscriber station), an SS (subscriber station), or the like.

Specific terminologies used in the following description are provided to help understand the present invention and the use of the specific terminologies can be modified into a different form in a range of not deviating from the technical idea of the present invention.

Occasionally, to prevent the present invention from getting vaguer, structures and/or devices known to the public are skipped or can be represented as block diagrams centering on the core functions of the structures and/or devices.

Wherever possible, the same reference numbers will be used throughout the drawings to refer to the same or like parts.

Embodiments of the present invention may be supported by the standard documents disclosed in at least one of wireless access systems including IEEE 802 system, 3GPP system, 3GPP LTE system, 3GPP LTE-A (LTE-Advanced) system and 3GPP2 system. In particular, the steps or parts, which are not explained to clearly reveal the technical idea of the present invention, in the embodiments of the present invention may be supported by the above documents. Moreover, all terminologies disclosed in this document may be supported by the above standard documents.

The following description of embodiments of the present invention may be usable for various wireless access systems including CDMA (code division multiple access), FDMA (frequency division multiple access), TDMA (time division multiple access), OFDMA (orthogonal frequency division multiple access), SC-FDMA (single carrier frequency division multiple access) and the like. CDMA can be implemented with such a radio technology as UTRA (universal terrestrial radio access), CDMA 2000 and the like. TDMA can be implemented with such a radio technology as GSM/GPRS/EDGE (Global System for Mobile communications)/General Packet Radio Service/Enhanced Data Rates for GSM Evolution). OFDMA can be implemented with such a radio technology as IEEE 802.11 (Wi-Fi), IEEE 802.16 (WiMAX), IEEE 802.20, E-UTRA (Evolved UTRA), etc. UTRA is a part of UMTS (Universal Mobile Telecommunications System). 3GPP (3$^{rd}$ Generation Partnership Project) LTE (long term evolution) is a part of E-UMTS (Evolved UMTS) that uses E-UTRA. The 3GPP LTE adopts OFDMA in downlink (hereinafter abbreviated DL) and SC-FDMA in uplink (hereinafter abbreviated UL). And, LTE-A (LTE-Advanced) is an evolved version of 3GPP LTE. WiMAX may be explained by IEEE 802.16e standard (e.g., WirelessMAN-OFDMA reference system) and advanced IEEE 802.16m standard (e.g., WirelessMAN-OFDMA advanced system). For clarity, the following description mainly concerns 3GPP LTE and LTE-A standards, by which the technical idea of the present invention may be non-limited.

FIG. 1 is a diagram of a structure of a radio frame. Referring to FIG. 1 (a), one radio frame includes 10 subframes. Each of the subframes includes 2 slots in time domain. And, a time taken to transmit one subframe is defined as a transmission time interval (hereinafter abbreviated TTI). For instance, one subframe may have a length of 1 ms and one slot may have a length of 0.5 ms. One slot may include a plurality of OFDM symbols in time domain. Since 3GPP LTE system uses OFDMA in downlink, OFDM symbol is provided to indicate one symbol period. The OFDM symbol may be named SC-FDMA symbol or symbol period in uplink. Resource block (RB) is a resource allocation unit and may include a plurality of contiguous subcarriers in one slot. The above-described structures of the radio frame are exemplary only. Hence, the number of subframes included in a radio frame, the number of slots included in the subframe and the number of OFDM symbols included in the slot may be modified in various ways.

FIG. 1(b) is a diagram for a structure of a radio frame of type 2. A type-2 radio frame includes 2 half frames. Each of the half frame includes 5 subframes, DwPTS (downlink pilot time slot), GP (guard period) and UpPTS (uplink pilot time slot). And, one of the subframes includes 2 slots. The DwPTS is used for initial cell search, synchronization or channel estimation in a user equipment. The UpPTS is used for channel estimation in a base station and uplink transmission synchronization of a user equipment. The guard period is a period for eliminating interference generated in uplink due to multi-path delay of a downlink signal between uplink and downlink.

In this case, the structures of the radio frame are exemplary only. And, the number of subframes included in a radio frame, the number of slots included in the subframe and the number of symbols included in the slot may be modified in various ways.

Figure 2:
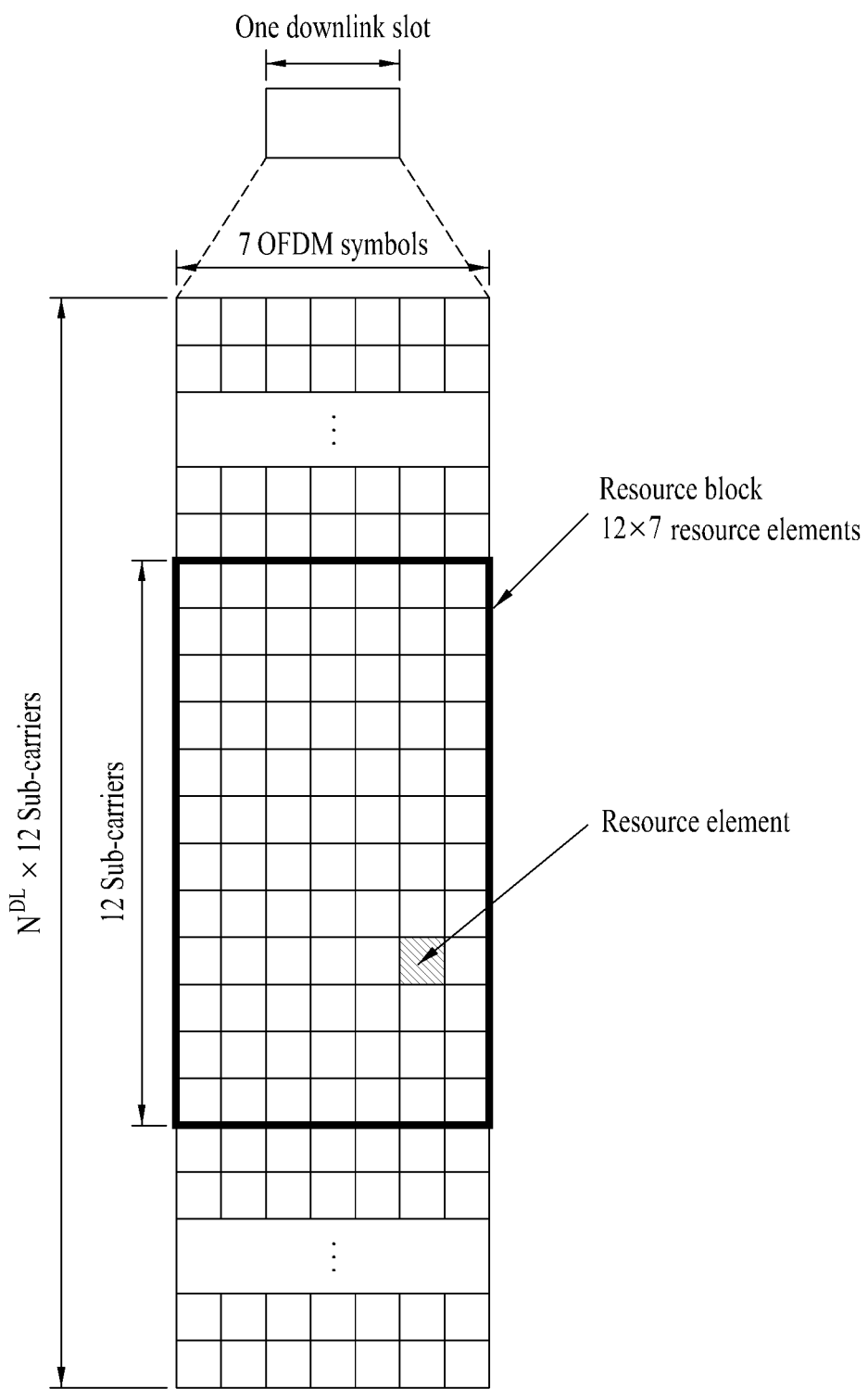
FIG. 2 is a diagram of a resource grid for a downlink (DL) slot.

FIG. 2 is a diagram of a resource grid for a downlink (DL) slot. Referring to FIG. 2, one downlink (DL) slot includes 7 OFDM symbols and one resource block (RB) includes 12 subcarriers in frequency domain, by which the present invention may be non-limited. For instance, in case of a normal CP (Cyclic Prefix), one slot includes 7 OFDM symbols. In case of an extended CP, one slot may include 6 OFDM symbols. Each element on a resource grid is called a resource element. One resource block includes 12×7 resource elements. The number $N^{DL}$ of resource blocks included in a DL slot may depend on a DL transmission bandwidth. And, the structure of an uplink (UL) slot may be identical to that of the DL slot.

Figure 3:
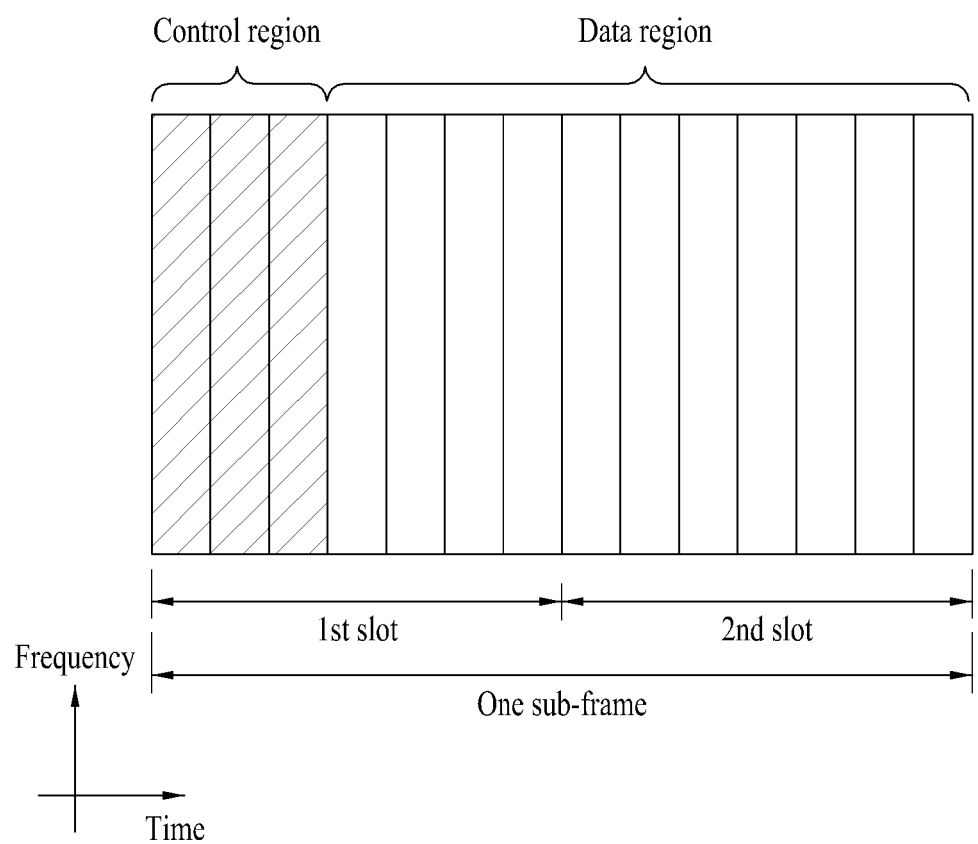
FIG. 3 is a diagram for a structure of a downlink (DL) subframe.

FIG. 3 is a diagram for a structure of a downlink (DL) subframe. Maximum 3 OFDM symbols situated in a head part of a first slot of one subframe correspond to a control region to which control channels are allocated. The rest of OFDM symbols correspond to a data region to which PDSCH (physical downlink shared channel) is allocated. Examples of DL control channels used by LTE system may include PCFICH (Physical Control Format Indicator Channel), PDCCH (Physical Downlink Control Channel), PHICH (Physical hybrid automatic repeat request indicator Channel) and the like.

The PCFICH is transmitted in a first OFDM symbol of a subframe and includes information on the number of OFDM symbols used for a transmission of a control channel within the subframe.

The PHICH is a response channel in response to UL transmission and includes an ACK/NACK signal. The PDCCH transmits downlink control information (DCI). The DCI includes UL or DL scheduling information according to a format or may include a transmit power control command for a random user equipment group.

DCI Format

According to a current LTE-A (release 10), DCI format 0, 1, 1A, 1B, 1C, 1D, 2, 2A, 2B, 2C, 3, 3A, and 4 are defined. In this case, the DCI format 0, 1A, 3, and 3A are regulated to have an identical message size to reduce the numbers of blind decoding, which shall be described later. The DCI formats can be classified into i) DCI format 0 and 4 used for UL scheduling grant, ii) DCI format 1, 1A, 1B, 1C, 1D, 2, 2A, 2B, 2C used for DL scheduling assignment, and iii) DCI format 3 and 3A used for a power control command according to a usage of control information to be transmitted.

In case of the DCI format 0 used for UL scheduling grant, the DCI format 0 can include a carrier offset (carrier indicator) necessary in relation to a carrier aggregation, which is described later, an offset (flag for format 0/format 1A differentiation) used for distinguishing the DCI format 0 from the DCI format 1, a hopping flag (frequency hopping flag) informing of whether a frequency hopping is used in an UL PUSCH transmission, information on resource block assignment, which should be used by a UE to transmit PUSCH, a modulation and coding scheme, a new data offset (a new data indicator) used to empty a buffer for an initial transmission in relation to a HARQ process, a transmit power control command for PUSCH (TPC command for scheduled for PUSCH), cyclic shift information (cyclic shift for DM RS and OCC index) for DMRS (demodulation reference signal), an UL index necessary for performing a TDD operation, channel quality information (channel quality indicator) request information (CSI request), and the like. Meanwhile, since the DCI format 0 uses synchronous HARQ, the DCI format 0 does not include a redundancy version as like DCI formats related to DL scheduling assignment do. The carrier offset is not included in the DCI format if the cross carrier scheduling is not used.

The DCI format 4 is newly added to LTE-A release 10. The DCI format 4 is defined to support that a spatial multiplexing is applied to a UL transmission. Compared to the DCI format 0, since the DCI format 4 further includes informations for the spatial multiplexing, the DCI format 4 has a bigger message size and further includes additional control information in addition to the control information included in the DCI format 0. In particular, the DCI format 4 further includes a modulation and coding scheme for a second transmission block, precoding information for a multi antenna transmission, and sounding reference signal (SRS) request information. Meanwhile, since the DCI format 4 has a size greater than the DCI format 0, the DCI format 4 does not include an offset to distinguish the DCI format 0 from the DCI format 1A.

The DCI format 1, 1A, 1B, 1C, 1D, 2, 2A, 2B, 2C related to a DL scheduling assignment can be mainly divided into 1, 1A, 1B, 1C, and 1D not supporting a spatial multiplexing and 2, 2A, 2B, and 2C supporting the spatial multiplexing.

The DCI format 1C is used for a compact DL assignment and supports a frequency consecutive assignment only. Unlike the other formats, the DCI format 1C does not include a carrier offset and a redundancy version.

The DCI format 1A is a format used for a DL scheduling and a random access procedure. The DCI format 1A can include a carrier offset, an indicator indicating whether a DL distributed transmission is used, PDSCH resource allocation information, a modulation and coding scheme, a redundancy version, a HARQ processor number configured to inform of a processor used for a soft combining, a new data offset used to empty a buffer for an initial transmission in relation to a HARQ process, a transmit power control command for PUCCH, a UL index needed for a TDD operation, and the like.

In case of the DCI format 1, most of control information is similar to that of the DCI format 1A. Yet, while the DCI format 1A is related to a consecutive resource allocation, the DCI format 1 supports a non-consecutive resource allocation. Hence, since the DCI format 1 further includes a resource allocation header, a control signaling overhead may increase a little as a tradeoff for an increase of resource allocation flexibility.

When the DCI format 1B and 1D are compared with the DCI format 1, there exists something in common in that they further include precoding information. The DCI format 1B and the DCI format 1D include PMI confirmation and DL power offset information, respectively. The other control information included in the DCI format 1B and 1D is mostly matched with that of the DCI format 1A.

The DCI format 2, 2A, 2B, and 2C basically include most of the control informations included in the DCI format 1A and further include informations used for a spatial multiplexing. The informations used for the spatial multiplexing correspond to a modulation and coding scheme for a second transmission block, a new data offset, and a redundancy version.

The DCI format 2 supports a closed-loop spatial multiplexing and the DCI format 2A supports an open-loop spatial multiplexing. Both the DCI format 2 and the DCI format 2A include precoding information. The DCI format 2B supports a dual-layer spatial multiplexing combined with a beamforming and further includes cyclic shift information for a DMRS. The DCI format 2C can be understood as an extended version of the DCI format 2B and supports a spatial multiplexing up to eight layers.

The DCI format 3 and 3A can be used to supplement the transmit power control information, which is included in the aforementioned DCI formats configured to perform UL scheduling grant and DL scheduling assignment. In particular, the DCI format 3 and 3A can be used to support a semi-persistent scheduling. In case of the DCI format 3, a command of 1 bit-long is used per UE. In case of the DCI format 3A, a command of 2-bit long is used per UE.

Among the aforementioned DCI formats, a prescribed DCI format is transmitted on PDCCH and a plurality of PDCCHs can be transmitted within a control region. A UE can monitor a plurality of the PDCCHs.

PDCCH Processing

In transmitting a DCI on PDCCH, a cyclic redundancy check (CRC) is attached to the DCI. In this process, a radio network temporary identifier (RNTI) is masked. In this case, a different RNTI can be used according to a purpose of transmitting a DCI. Specifically, in case of a paging message related to a network initiation connection establishment, a P-RNTI can be used. An RA-RNTI can be used in case of a random access and an SI-RNTI can be used in case of a system information block (SIB). And, in case of a unicast transmission, a C-RNTI, which is a unique UE identifier, can be used. The DCI attached with a CRC is coded with a prescribed code and then is adjusted according to the quantity of resource used for a transmission via a rate-matching.

In case of transmitting the aforementioned PDCCH, a control channel element (CCE), which is a consecutive logical allocation unit, is used to efficiently process the transmission when the PDCCH is mapped to REs. The CCE consists of 36 REs and this corresponds to 9 sets of resource element group (REG). The number of CCEs used for a transmission of a specific PDCCH varies according to a DCI payload, which is a size of control information, a cell bandwidth, a channel coding rate, and the like. Specifically, the number of CCEs necessary for a specific PDCCH can be defined according to a PDCCH format as shown in a following Table 1.

TABLE 1

| PDCCH format | Number of CCEs | Number of resource element groups | Number of PDCCH bits |
| --- | --- | --- | --- |
| 0 | 1 | 9 | 72 |
| 1 | 2 | 18 | 144 |
| 2 | 4 | 36 | 288 |
| 3 | 8 | 72 | 576 |

Referring to Table 1, the number of CCEs varies according to a PDCCH format. For instance, while using a PDCCH format 0, if a channel state becomes worse, a transmitting side can change the PDCCH format to 2 to adaptively use the PDCCH format.

Blind Decoding

As mentioned in the foregoing description, PDCCH can be used by a prescribed one format among the four formats and the prescribed one format is not informed to a UE. Hence, in terms of the UE, the UE should perform a decoding while the PDCCH format is not known to the UE. This is called a blind decoding. Yet, since the decoding all available CCEs used for a DL according to each PDCCH format may become a big burden to the UE, a search space is defined in consideration of a limitation for a scheduler and the number of decoding attempt.

In particular, the search space is a set of candidate PDCCHs consisted of CCEs where the UE should perform a decoding attempt on an aggregation level. In this case, the aggregation level and the number of PDCCH candidate can be defined as Table 2 as follows.

TABLE 2

| | Search space | | Number of PDCCH |
|---|---|---|---|
| | Aggregation level | Size (CCE) | candidate |
| UE-specific | 1 | 6 | 6 |
| | 2 | 12 | 6 |
| | 4 | 8 | 2 |
| | 8 | 16 | 2 |
| Common | 4 | 16 | 4 |
| | 8 | 16 | 2 |

Referring to Table 2, since there exist 4 types of aggregation level, the UE may have a plurality of search spaces according to each of the aggregation levels.

Referring to Table 2, the search space can be divided into a UE-specific search space and a common search space. The UE-specific search space is configured for specific UEs. Each UE monitors (performing a decoding attempt on a set of PDCCH candidates according to an available DCI format) the UE-specific search space and checks whether an RNTI and a CRC masked on PDCCH is valid. If it is valid, the UE can obtain control information.

The common search space is configured for such a case that a plurality of UEs or all UEs need to receive PDCCH as a dynamic scheduling for system information, a paging message, or the like. Yet, the common search space can also be used for a specific UE in managing a resource. And, the common search space and the UE-specific search space may overlap with each other.

Figure 4:
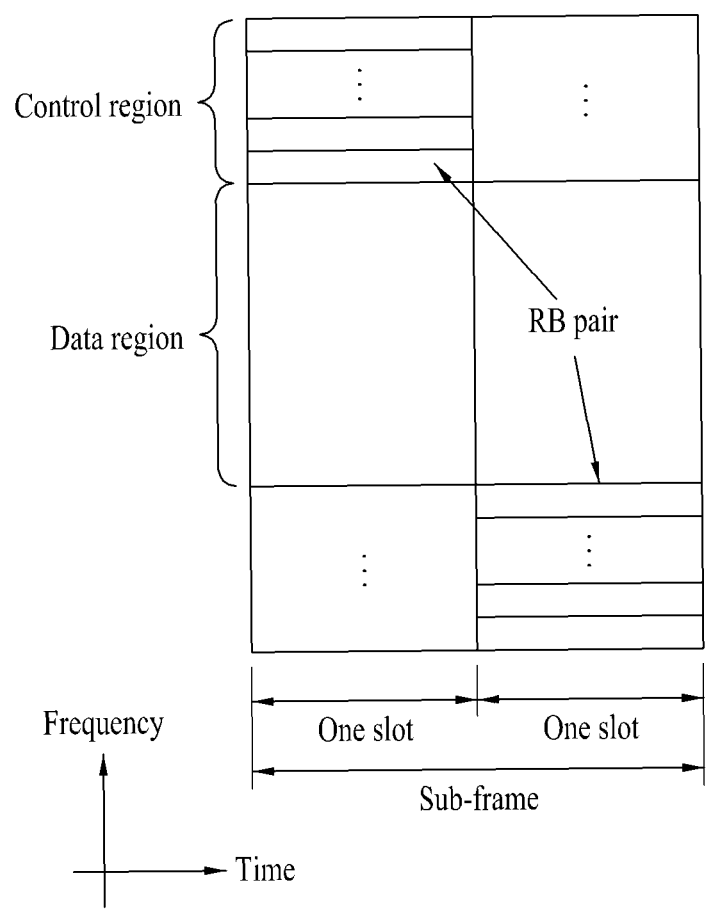
FIG. 4 is a diagram for a structure of an uplink (UL) subframe.
Figure 6:
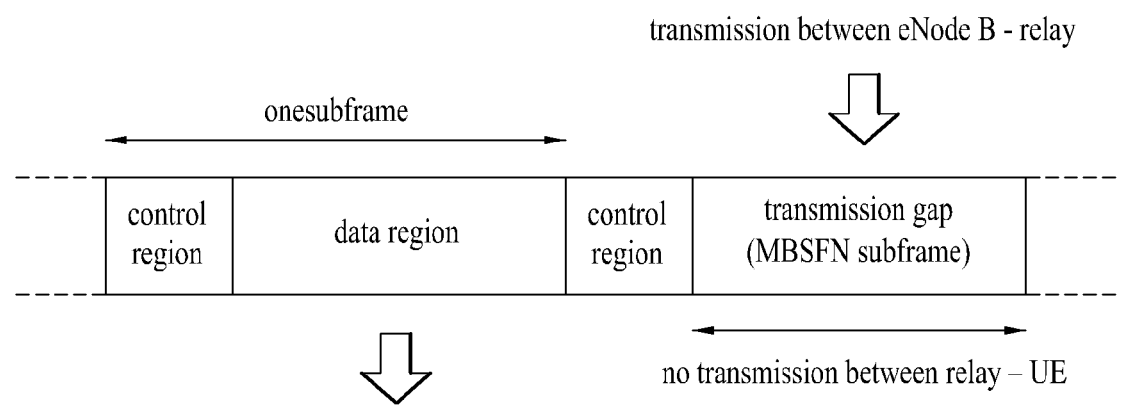
FIG. 6 is a diagram of an example for performing a backhaul transmission using an MBSFN subframe.

FIG. 4 is a diagram for a structure of an uplink (UL) subframe. Referring to FIG. 4, a UL subframe may be divided into a control region and a data region in frequency domain. A physical UL control channel (PUCCH), which includes UL control information, is allocated to the control region. And, a physical UL shared channel (PUSCH), which includes user data, is allocated to the data region. In order to maintain single carrier property, one user equipment does not transmit PUCCH and PUSCH simultaneously. PUCCH for one user equipment is allocated to a resource block pair (RB pair) in subframe. Resource blocks belonging to the resource block (RB) pair may occupy different subcarriers in each of 2 slots. Namely, a resource block pair allocated to PUCCH is frequency-hopped on a slot boundary.

Multi Input Multi Output (MIMO)

FIG. 5 is a diagram of a wireless communication system having a multi antenna.

As depicted in FIG. 5(a), if $N_T$ number of transmitting antenna is installed in a transmitting end and $N_R$ number of receiving antenna is installed in a receiving end, a theoretical channel transmission capacity is increased compared to a case that the plural number of antennas are only used for either the transmitting end or the receiving end. The increase of the channel transmission capacity is proportional to the number of antenna. Thus, a transfer rate is enhanced and frequency efficiency is considerably enhanced. As the channel transmission capacity increases, the transfer rate can be theoretically increased as much as the maximum transfer rate ($R_o$) multiplied by a rate of increase ($R_i$).

$$R_i \min(N_T, N_R) \quad \text{[Formula 1]}$$

For instance, MIMO communication system using 4 transmitting antennas and 4 receiving antennas may be able to theoretically obtain the transfer rate of 4 times of a single antenna system.

A communication method in a multi antenna system is explained in more detail using a mathematical modeling. Assume that there exist $N_T$ number of transmitting antenna and $N_R$ number of receiving antenna in the system.

First of all, if we look into a transmission signal, since the maximum number of information capable of being transmitted is $N_T$ in case that there exists $N_T$ number of transmitting antenna, transmission information can be represented as a vector in the following Formula 2.

$$s = [s_1, s_2, \ldots, s_{N_T}]^T \quad \text{[Formula 2]}$$

Meanwhile, for each of the transmission informations $s_1, s_2, \ldots, s_{N_T}$ a transmit power may be differentiated according to the each of the transmission informations. In this case, if each of the transmit powers is represented as $P_1, P_2, \ldots, P_{N_T}$, transmit power-adjusted transmission information can be represented as follows.

$$\hat{s} = [\hat{s}_1, \hat{s}_2, \ldots, \hat{s}_{N_T}]^T = [P_1 s_1, P_2 s_2, \ldots, P_{N_T} s_{N_T}]^T \quad \text{[Formula 3]}$$

And, $\hat{s}$ can be represented as follows using a diagonal matrix $$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \quad \text{[Formula 4]}$$

Meanwhile, let's consider a case that the $N_T$ number of transmission signal $x_1, x_2, \ldots, x_{N_T}$, which is practically transmitted, is configured in a manner of applying a weighted matrix W to the adjusted information vector $\hat{S}$. In this case, the weighted matrix W plays a role in distributing the transmission information to each of the antennas according to the situation of the transmission channel and the like. The transmission signal $x_1, x_2, \ldots, x_{N_T}$ can be represented using a vector X in the following Formula 5.

$$X = \begin{bmatrix} x_1 \\ x_2 \\ \vdots \\ x_i \\ \vdots \\ x_{N_T} \end{bmatrix} \quad \text{[Formula 5]}$$

$$= \begin{bmatrix} w_{11} & w_{12} & \cdots & w_{1N_T} \\ w_{21} & w_{22} & \cdots & w_{2N_T} \\ \vdots & & \ddots & \vdots \\ w_{i1} & w_{i2} & \cdots & w_{iN_T} \\ \vdots & & \ddots & \vdots \\ w_{N_T 1} & w_{N_T 2} & \cdots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix}$$

$$= W\hat{s}$$

$$= WPs$$

In this case, $W_{ij}$ means a weighting between an $i^{th}$ transmitting antenna and $j^{th}$ information. The W is called a precoding matrix as well.

In case that there exist $N_R$ number of receiving antenna, a reception signal of each antenna $y_1, y_2, \ldots, y_{NR}$ can be represents as a vector y as follows.

$$y = [y_1, y_2, \ldots, y_{N_R}]^T \qquad \text{[Formula 6]}$$

Meanwhile, in case of modeling a channel in a multi antenna wireless communication system, each channel can be distinguished according to an index of transmitting/receiving antenna. A channel passing through a transmitting antenna j and a receiving antenna i is represented as a $h_{ij}$. In this case, be cautious that the index of a receiving antenna is preceding and the index of a transmitting antenna is following in the order of the index of $h_{ij}$.

Meanwhile, FIG. 5(b) is a diagram for channels from $N_T$ transmitting antenna to a receiving antenna i. Referring to FIG. 5(b), channels starting from a total $N_T$ number of transmitting antenna to a receiving antenna i can be represented as follows.

$$h_i^T = [h_{i1}, h_{i2}, \ldots, h_{iN_T}] \qquad \text{[Formula 7]}$$

Hence, channels passing through $N_T$ number of transmitting antenna and $N_R$ number of receiving antenna can be represented as follows.

$$H = \begin{bmatrix} h_1^T \\ h_2^T \\ \vdots \\ h_i^T \\ \vdots \\ h_{N_R}^T \end{bmatrix} = \begin{bmatrix} h_{11} & h_{12} & \ldots & h_{1N_T} \\ h_{21} & h_{22} & \ldots & h_{2N_T} \\ \vdots & & \ddots & \\ h_{i1} & h_{i2} & \ldots & h_{iN_T} \\ \vdots & & \ddots & \\ h_{N_R 1} & h_{N_R 2} & \ldots & h_{N_R N_T} \end{bmatrix} \qquad \text{[Formula 8]}$$

An Additive White Gaussian Noise (AWGN) is added to a practical channel after the channel passes through the channel matrix H. The Additive White Gaussian Noise $n_1, n_2, \ldots, n_{NR}$ added to each of the $N_R$ number of receiving antenna can be represented as follows.

$$n = [n_1, n_2, \ldots, n_{N_R}]^T \qquad \text{[Formula 9]}$$

A reception signal can be represented as follows via the aforementioned mathematical modeling.

$$y = \begin{bmatrix} y_1 \\ y_2 \\ \vdots \\ y_i \\ \vdots \\ y_{N_R} \end{bmatrix} = \begin{bmatrix} h_{11} & h_{12} & \ldots & h_{1N_T} \\ h_{21} & h_{22} & \ldots & h_{2N_T} \\ \vdots & & \ddots & \\ h_{i1} & h_{i2} & \ldots & h_{iN_T} \\ \vdots & & \ddots & \\ h_{N_R 1} & h_{N_R 2} & \ldots & h_{N_R N_T} \end{bmatrix} \begin{bmatrix} x_1 \\ x_2 \\ \vdots \\ x_j \\ \vdots \\ x_{N_T} \end{bmatrix} + \begin{bmatrix} n_1 \\ n_2 \\ \vdots \\ n_i \\ \vdots \\ n_{N_R} \end{bmatrix} \qquad \text{[Formula 10]}$$

$$= Hx + n$$

Meanwhile, the number of row and column of the channel matrix H, which indicate a state of a channel, is determined by the number of transmitting and receiving antenna. In the channel matrix H, the number of column becomes identical to the number of receiving antenna $N_R$ and the number of row becomes identical to the number of transmitting antenna $N_T$. In particular, the channel matrix H becomes $N_R \times N_T$ matrix.

In general, a rank of a matrix is defined by a minimum number of the numbers of row or column independent from each other. Hence, the rank of the matrix is configured not to be greater than the number of the row or the column. For instance, the rank of a channel matrix H (rank (H)) is limited as follows.

$$\text{rank}(H) \leq \min(N_T, N_R) \qquad \text{[Formula 11]}$$

As a different definition of a rank, when Eigen value decomposition is performed on a matrix, the rank can be defined by the number of Eigen values, which is not a '0' among the Eigen values. Similarly, as a further different definition of the rank, the rank can be defined by the number of singular values, which is not '0' when SVD (singular value decomposition) is performed on a matrix. Hence, a physical meaning of a rank of a channel matrix may indicate a maximum number capable of transmitting different information from each other in a given channel.

Random Access

A user equipment can perform a random access procedure in one of the following cases in LTE system.

The user equipment performs an initial access since there is no connection (e.g., RRC connection) to an eNode B.

The user equipment initially accesses a target cell in a handover procedure.

The random access procedure is requested by a command of an eNode B.

In a situation that time synchronization of uplink is not matched or a designated radio resource used to make a request for a radio resource is not allocated, data occurs in uplink.

A recovery procedure is performed in case of radio link failure or handover failure.

Based on the aforementioned contents, a general contention-based random access procedure is explained in the following description.

Figure 7:
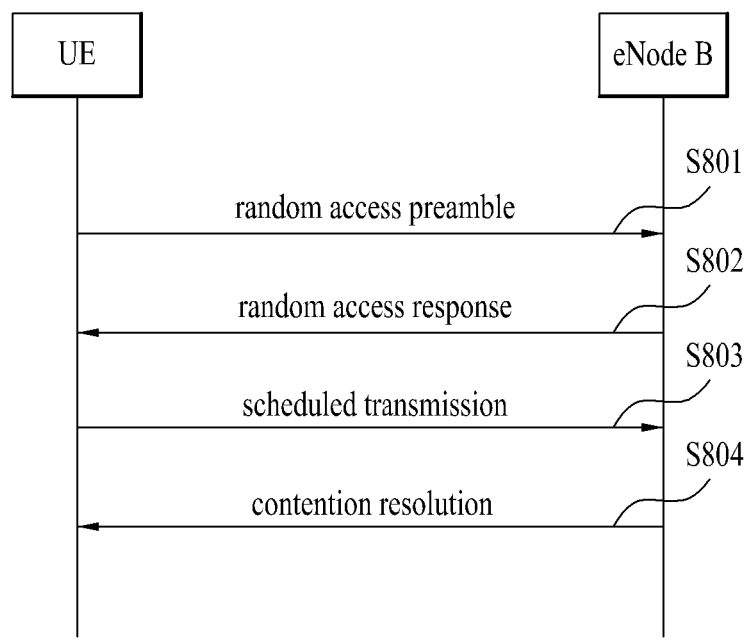
FIG. 7 is a diagram for explaining an operation process between a user equipment and an eNode B in a contention-based random access procedure.

FIG. 7 is a diagram for explaining an operation process between a user equipment and an eNode B in a contention-based random access procedure.

(1) $1^{St}$ Message Transmission

First of all, a user equipment randomly selects a random access preamble from a set of random access preambles indicated by system information or a handover command, selects a PRACH (physical RACH) resource for carrying the random access preamble, and then transmits the random access preamble via the selected PRACH resource [S801].

(2) $2^{nd}$ Message Reception

After the user equipment has transmitted the random access preamble in the step S801, the user equipment attempts a reception of its random access response in a random access response receiving window indicated by an eNode B through the system information or the handover command [S802]. In particular, the random access response information may be transmitted in format of MAC PDU. And, the MAC PDU may be carried on PDSCH (physical downlink shared channel). In order to receive the information carried on the PDSCH, the user equipment preferably monitors PDCCH (physical downlink control channel). In particular, information on a user equipment necessary to receive the PDSCH, a frequency and time information of a radio resource of the PDSCH, a transmission format of the PDSCH and the like may be preferably included in the PDCCH. Once the user equipment succeeds in the reception of the PDCCH transmitted to the user equipment, it may be able to appropriately receive a random access response carried on the PDSCH in accordance with the informations of the PDCCH. And, a random access preamble identifier (ID) (e.g., RAPID (random access preamble identifier), a UL grant indicating a UL radio resource, a temporary cell identifier (temporary C-RNTI), time synchronization correction value (timing advance command (TAC)) and the like can be included in the random access response.

As mentioned in the foregoing description, the random access preamble identifier is required for the random access response. Since random access response information for at least one or more user equipments may be included in one random access preamble, it may be necessary to indicate the UL grant, the temporary cell identifier and the TAC are valid for which user equipment. In this step, assume that the user equipment selects a random access preamble identifier matching the random access preamble selected by the user equipment in the step S802. Through this, the user equipment may be able to receive a UL grant, a temporary cell identifier 9 temporary C-RNTI), time synchronization correction value (timing advance command: TAC) and the like.

(3) $3^{Rd}$ Message Transmission

If the user equipment receives the random access response valid for the user equipment, the user equipment processes the informations included in the random access response. In particular, the user equipment applies the TAC and saves the temporary cell identifier. Moreover, the user equipment may be able to save data, which is to be transmitted in response to the valid random access response, in a message-3 buffer.

Meanwhile, using the received UL grant, the user equipment transmits data (i.e., a $3^{rd}$ message) to the eNode B [S803]. The $3^{rd}$ message should include an identifier of the user equipment. In the contention based random access procedure, an eNode B is unable to determine which user equipments perform the random access procedure. In order for the eNode B to resolve the contention later, the eNode B needs to identify a user equipment.

As a method of including an identifier of a user equipment, two kinds of methods have been discussed. According to a $1^{st}$ method, if a user equipment has a valid cell identifier already allocated by a corresponding cell prior to the random access procedure, the user equipment transmits its cell identifier via a UL transmission signal corresponding to the UL grant. On the contrary, if the user equipment fails to receive the allocation of a valid cell identifier prior to the random access procedure, the user equipment transmits its unique identifier (e.g., S-TMSI, random ID (Random Id), etc.). In general, the unique identifier is longer than the cell identifier. If the user equipment transmits data corresponding to the UL grant, the user equipment initiates a contention resolution timer (hereinafter abbreviated CR timer).

(4) $4^{th}$ Message Reception

After the user equipment has transmitted the data including its identifier via the UL grant included in the random access response, the user equipment waits for an instruction from the eNode B for the contention resolution. In particular, the user equipment may attempt a reception of PDCCH to receive a specific message [S804]. As a method of receiving the PDCCH, two kinds of methods have been discussed. As mentioned in the foregoing description, if the $3^{rd}$ message transmitted in response to the UL grant uses a cell identifier as its identifier, the user equipment attempts a reception of PDCCH using its cell identifier. If the identifier is a unique identifier, the user equipment may be able to attempt a reception of PDCCH using a temporary cell identifier included in the random access response. Thereafter, in the former case, if the PDCCH is received via its cell identifier before expiration of the contention resolution timer, the user equipment determines that the random access procedure is normally performed and then ends the random access procedure. In the latter case, if PDCCH is received via a temporary cell identifier before expiration of the contention resolution timer, the user equipment checks data carried on PDSCH indicated by the PDCCH. If the unique identifier of the user equipment is included in a content of the data, the user equipment determines that the random access procedure is normally performed and then ends the random access procedure.

Meanwhile, in an operation of a non-contention based random access procedure, unlike the contention based random access procedure shown in FIG. 7, a random access procedure is ended with a $1^{st}$ message transmission and a $2^{nd}$ message transmission only. Yet, before a user equipment transmits a random access preamble as a $1^{st}$ message to an eNode B, the user equipment receives assignment of the random access preamble from the e Node B, transmits the assigned random access preamble as the $1^{st}$ message to the eNode B, and then receives a random access response from the eNode B, whereby the random access procedure is ended.

Carrier Aggregation

Figure 8:
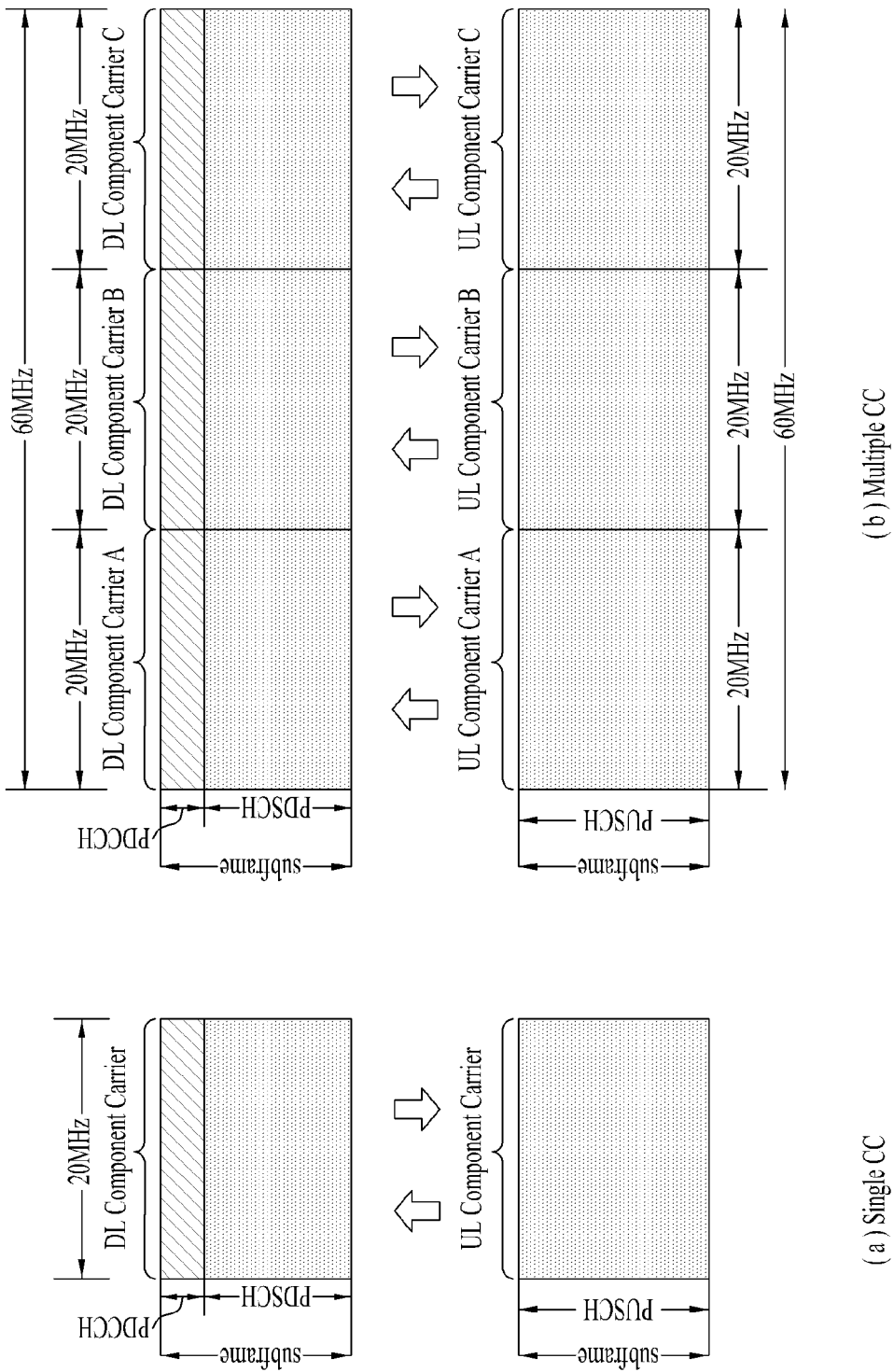
FIG. 8 is a diagram for explaining a carrier aggregation.

FIG. 8 is a diagram for explaining a carrier aggregation. Prior to explaining the carrier aggregation, a concept of a cell introduced to manage a radio resource in LTE-A is explained first. A cell can be understood as a combination of a DL resource and a UL resource. In this case, the UL resource is not an essential element. Hence, a cell can consist of the DL resource only or both the DL resource and the UL resource. Yet, this is the definition of a current LTE-A release 10 and an opposite case, i.e., a cell consisted of the UL resource only is also possible. The DL resource may be called a downlink component carrier (DL CC) and the UL resource may be called an uplink component carrier (UL CC). The UL CC and the DL CC can be represented by a carrier frequency. The carrier frequency means a center frequency of a corresponding cell.

A cell can be classified into a primary cell (PCell) operating on a primary frequency and a secondary cell (SCell) operating on a secondary frequency. The PCell and the Scell can be commonly called a serving cell. A cell indicated by a UE in a process of performing an initial connection establishment, a connection re-establishment, or a handover can become the PCell. In particular, The PCell may mean the cell becoming a center of a control related communication in a carrier aggregation environment. In particular, a UE is able to perform a transmission by receiving assignment of PUCCH in its PCell. The SCell is configurable only after an RRC connection has been established. And, the SCell may be usable to provide an addition radio resource. The rest of the serving cells except the PCell may correspond to the Scell in the carrier aggregation environment. If a carrier aggregation is not configured for a user equipment in RRC_CONNECTED state or a user equipment does not support a carrier aggregation, there exists one serving cell configured with PCell only. On the other hand, if a carrier aggregation is configured for a user equipment in RRC_CONNECTED state, at least one serving cell may be able to exist. And, PCell and at least one SCell are included in all the serving cells. After an initial security activating process has started, a network may be able to configure at least one SCell in addition to PCell configured in the early stage of a connection establishment process for the UE supporting carrier aggregation.

In the following description, carrier aggregation is explained with reference to FIG. 8. The carrier aggregation is a technique introduced to enable a user to use a wider band to meet a request for a higher fast throughput. The carrier aggregation can be defined as an aggregation of two or more component carriers (CCs) including a carrier frequency different from each other. Referring to FIG. 8, FIG. 8(a) indicates a subframe using one CC in a legacy LTE system and FIG. 8(b) indicates a subframe to which a carrier aggregation is applied. FIG. 8(b) depicts an example that the subframe supports a bandwidth of total 60 MHz in a manner of using three CCs of 20 MHz. In this case, each CC can be configured to be contiguous or non-contiguous.

A UE can simultaneously receive and monitor a UL data via a plurality of DL CCs. A linkage between a DL CC and a UL CC may be indicated by system information. DL CC/UL CC link can be configured to be fixed in a system or semi-statically. And, although a system total band is configured with N number of CCs, a frequency band capable of being monitored/received by a specific UE may be limited to M (<N) number of CCs. Various parameters for the carrier aggregation can be configured cell-specifically, UE group-specifically, or UE-specifically.

Figure 9:
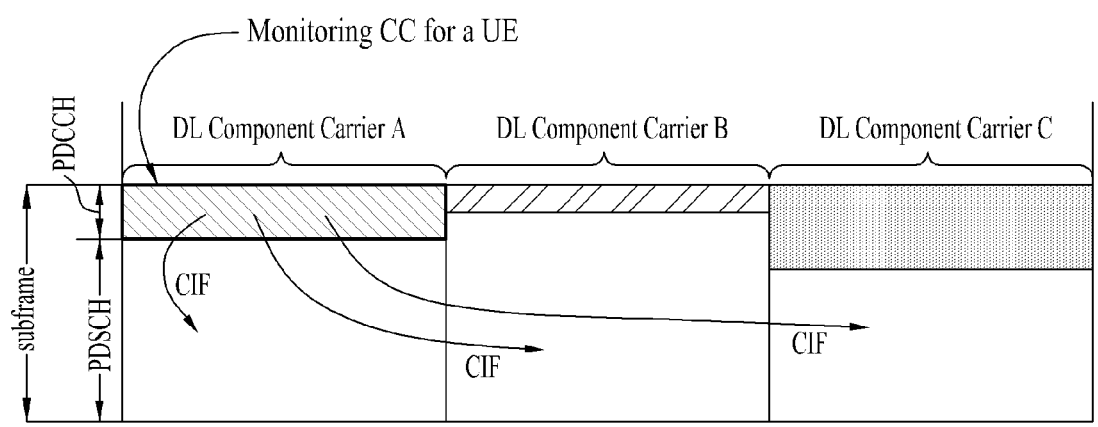
FIG. 9 is a diagram for explaining a cross carrier scheduling.

FIG. 9 is a diagram for explaining a cross carrier scheduling. For instance, the cross carrier scheduling means to include all of DL scheduling assignment information of a different DL CC into a control region of a prescribed DL CC among a plurality of serving cells. Or, the cross carrier scheduling means to include all UL scheduling grant information on a plurality of UL CCs, which are linked to a prescribed DL CC among a plurality of serving cells, into a control region of the prescribed DL CC.

First of all, a carrier indicator field (CIF) is explained.

As mentioned earlier, the CIF may be included in a DCI format transmitted on PDCCH or not included in the DCI format transmitted on PDCCH. If the CIF is included in the DCI format, it indicates that the cross carrier scheduling is applied. In case that the cross carrier scheduling is not applied, DL scheduling assignment information is valid for a DL CC to which the DL scheduling assignment information is currently transmitted. And, an UL scheduling grant is valid for one UL CC linked to the DL CC to which a DL scheduling assignment information is transmitted.

In case that the cross carrier scheduling is applied, a CIF indicates a CC related to the DL scheduling assignment information, which is transmitted on PDCCH in a prescribed one DL CC. For instance, referring to FIG. 14, DL assignment information for DL CC B and DL CC C, i.e., information on PDSCH resource is transmitted on PDCCH situated in the control region of DL CC A. A UE may be aware of the resource region of PDSCH and a corresponding CC via the CIF in a manner of monitoring the DL CC A.

Whether a CIF is included in PDCCH or not can be semi-statically configured and can be UE-specifically enabled by an upper layer signaling. In case that a CIF is disabled, PDCCH on a specific DL CC allocates PDSCH resource situated on an identical DL CC and may be able to allocate PUSCH resource situated on UL CC linked to the specific DL CC. In this case, a coding scheme identical to a legacy PDCCH structure, CCE-based resource mapping, DCI format, and the like can be applied.

Meanwhile, in case that a CIF is enabled, PDCCH on a specific DL CC can allocate PDSCH/PUSCH resource on one DL/UL CC indicated by the CIF among a plurality of aggregated CCs. In this case, the CIF can be additionally defined in a legacy PDCCH DCI format. The CIF is defined by a fixed field of 3 bit-long or can be fixed irrespective of a DCI format size. In this case, a coding scheme identical to a legacy PDCCH structure, CCE-based resource mapping, DCI format, and the like can be applied as well.

Figure 14:
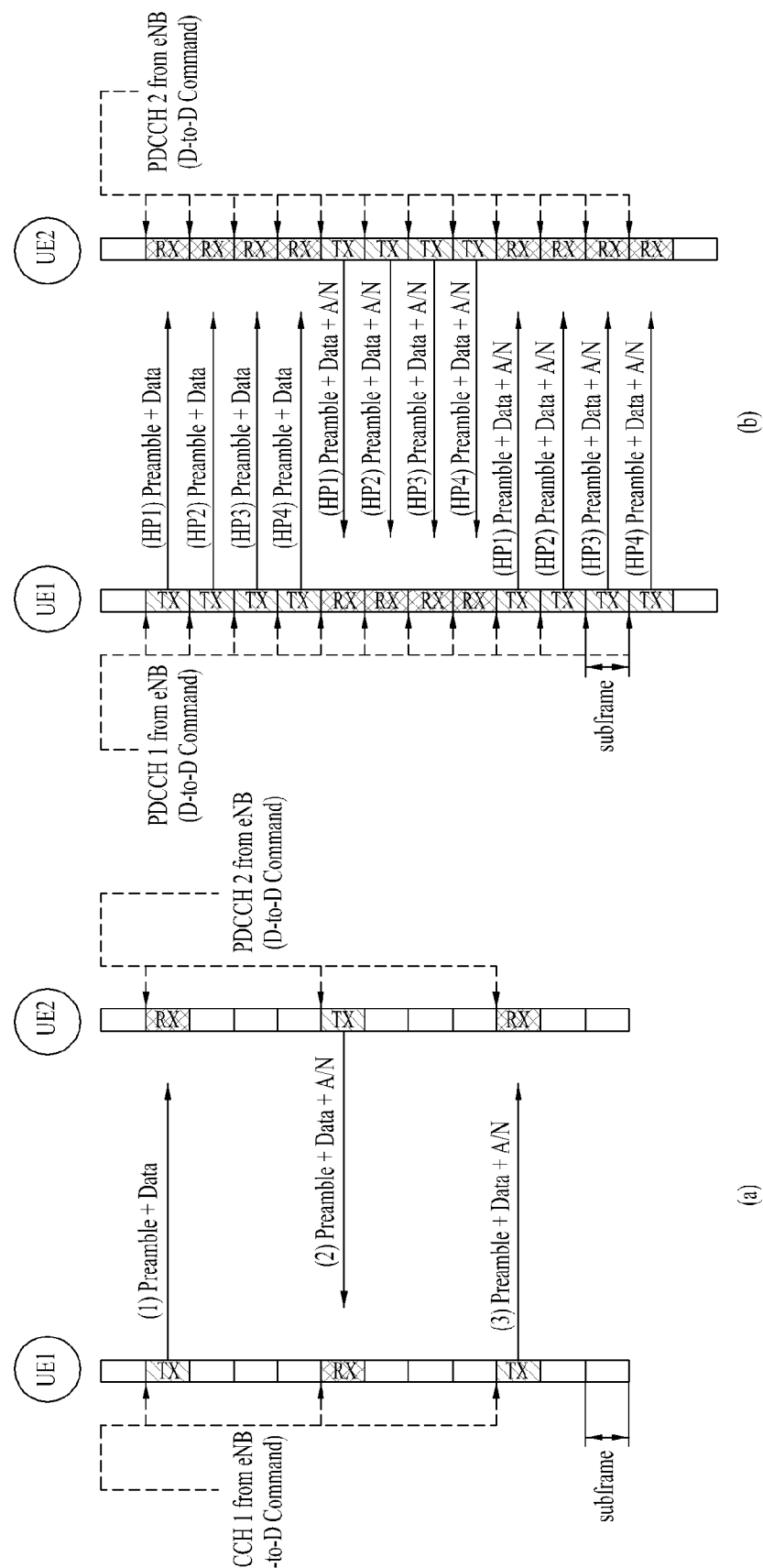
FIG. 14 is a diagram for explaining a D-to-D communication procedure according to one embodiment of the present invention in relation to transmission/reception timing.

In case that a CIF exists, a base station can assign a set of DL CCs to monitor PDCCH. By doing so, a burden of blind decoding of a UE can be reduced. The set of DL CCs monitoring PDCCH is a part of a total aggregated DL CC and the UE can perform PDCCH detection/decoding on the corresponding set of DL CCs only. In particular, in order to schedule PDSCH/PUSCH for the UE, the base station can transmit PDCCH on the set of DL CCs for monitoring PDCCH only. The set of DL CCs for monitoring PDCCH can be configured UE-specifically, UE group-specifically, or cell-specifically. For instance, as depicted in the example of FIG. 14, in case that 3 DL CCs are aggregated, DL CC A can be configured as the DL CC for monitoring PDCCH. In case that a CIF is disabled, PDCCH on each of the DL CCs can schedule PDSCH on the DL CC A only. Meanwhile, if the CIF is enabled, PDCCH on the DL CC A can schedule not only PDSCH on the DL CC A but also PDSCH on a different DL CC. In case that the DL CC A is configured as the DL CC for monitoring PDCCH, PDSCH is not transmitted to the DL CC B and the DL CC C.

In a system to which the aforementioned carrier aggregation is applied, a UE can receive a plurality of PDSCHs on a plurality of DL carriers. In this case, there may exist a case that the UE transmits ACK/NACK for each data on a single UL CC in one subframe. In case of transmitting a plurality of ACK/NACK in one subframe using PUCCH format 1a/1b, higher transmit power is required, PAPR of a UL transmission is increased, and a distance capable of being transmitted by the UE to a base station may be decreased due to an inefficient use of a transmit power amplifier. ACK/NACK bundling or ACK/NACK multiplexing can be applied to transmit a plurality of the ACK/NACK on one PUCCH.

And, there may exist a case that ACK/NACK information on a plurality of DL data resulted from an application of carrier aggregation and/or ACK/NACK information on a plurality of DL data transmitted from a plurality of DL subframes in a TDD system should be transmitted on PUCCH in one subframe. In this case, if the number of ACK/NACK bits to be transmitted is greater than the number of bits capable of being supported by the ACK/NACK bundling or the ACK/NACK multiplexing, the ACK/NACK information cannot be properly transmitted by the aforementioned schemes.

PUCCH Piggyback

In case of an uplink transmission of a legacy 3GPP LTE system (e.g., release-8), a single carrier transmission of a good PAPR (peak-to-average power ratio) or a good CM (cubic metric) influencing the performance of a power amp is maintained to efficiently utilize the power amp of a UE. In particular, in case of a PUSCH transmission of a legacy LTE system, a single carrier property of a data intended to be transmitted is maintained by a DFT-precoding. In case of a PUCCH transmission, the single carrier property can be maintained by transmitting a sequence having the single carrier property in a manner of loading information on the sequence. Yet, in case of non-contiguously assigning a DFT-precoded data to a frequency axis or in case of simultaneously transmitting PUSCH and PUCCH, the single carrier property is not maintained.

Figure 10:
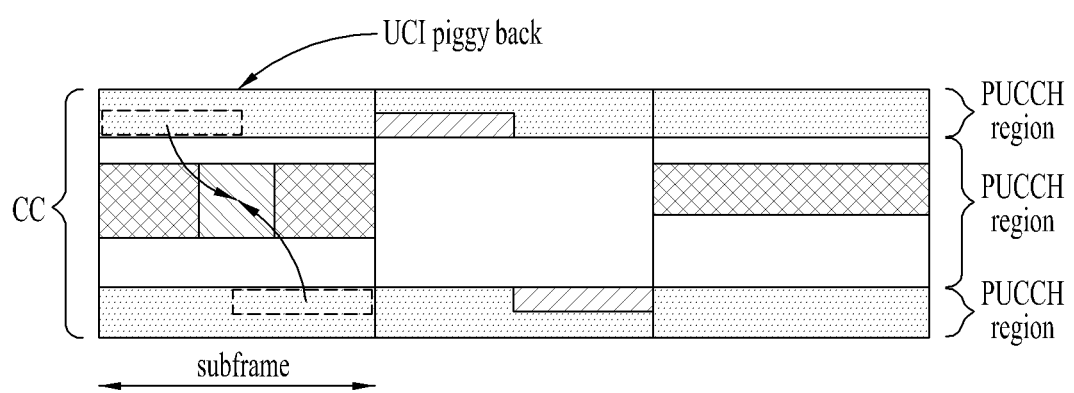
FIG. 10 is a diagram for explaining a scheme of transmitting uplink control information on PUSCH.

Hence, as depicted in FIG. 10, in case that there is PUSCH transmission in a subframe identical to PUCCH transmission, UCI (uplink control information) supposed to be transmitted on PUCCH is transmitted (piggyback) on PUSCH together with a data to maintain the single carrier property.

As mentioned in the foregoing description, since PUCCH and PUSCH cannot be transmitted in a legacy LTE UE at the same time, in a subframe to which the PUSCH is transmitted, a method of multiplexing the UCI (CQI/PMI, HARQ-ACK, RI, and the like) in the PUSCH region is used. As an example, in case of transmitting CQI and/or PMI in a subframe assigned to transmit PUSCH, control information and a data can be transmitted together by multiplexing UL-SCH data and the CQI/PMI prior to a DFT-spreading. In this case, the UL-SCH data performs a rate-matching in consideration of a CQI/PMI resource. And, such control information as a HARQ ACK, an RI, and the like can be multiplexed in a PUSCH region in a manner of puncturing the UL-SCH data.

D-to-D (Device to Device) Communication

In case that a D-to-D (Device to Device) communication is introduced to the aforementioned wireless communication system (e.g., 3GPP LTE system or 3GPP LTE-A system), detail method for performing the D-to-D communication is described in the following description. In case of the D-to-D communication, data transmission/reception can be performed between user equipments without a consistent involvement of an eNode B. Yet, in the embodiment of the present invention, assume that the user equipments performing the D-to-D communication is under a prescribed control of the eNode B to solve a problem of wasting a resource caused by an indiscreet communication between user equipments, a problem of causing interference, and the like.

Figure 11:
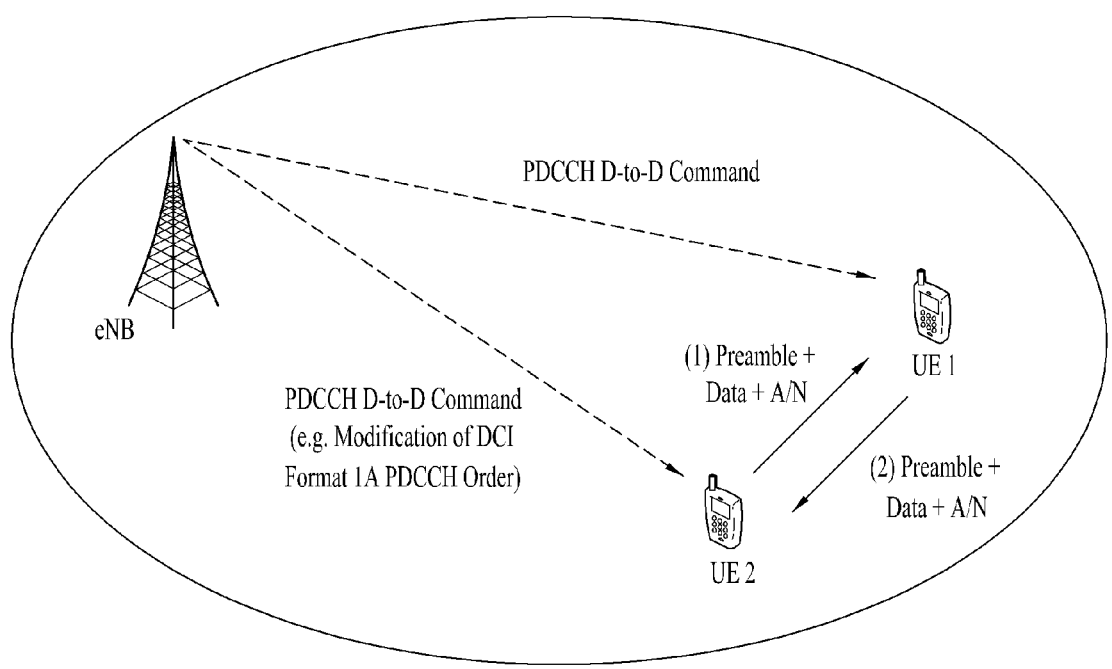
FIG. 11 is a diagram of a D-to-D communication system according to one embodiment of the present invention.

FIG. 11 is a diagram of a D-to-D communication system according to one embodiment of the present invention. Referring to FIG. 11, a concept that a first user equipment (UE 1) and a second user equipment (UE 2), which have received PDCCH of an eNode B (eNB), perform a communication with each other is depicted. The first UE and the second UE can use a UL resource to perform a D-to-D communication. In this case, in order for the first UE and the second UE to perform a smooth communication, mutual UL synchronization should be obtained. Specifically, in terms of the UE and the eNode B, the UE obtains a DL synchronization of the eNode B via a cell search procedure and then obtains the UL synchronization of the eNode B via a random access procedure. Hence, although the first UE and the second UE in FIG. 11 may have the UL synchronization of the eNode, the first UE and the second UE may not know the mutual UL synchronization. And, it is inefficient for each UE in a cell to continuously possess UL synchronization information of all UEs capable of performing a D-to-D communication except a corresponding UE to perform the D-to-D communication. Hence, in the following description, a communication method capable of efficiently supporting the D-to-D communication while solving the aforementioned problem is described in detail.

Figure 12:
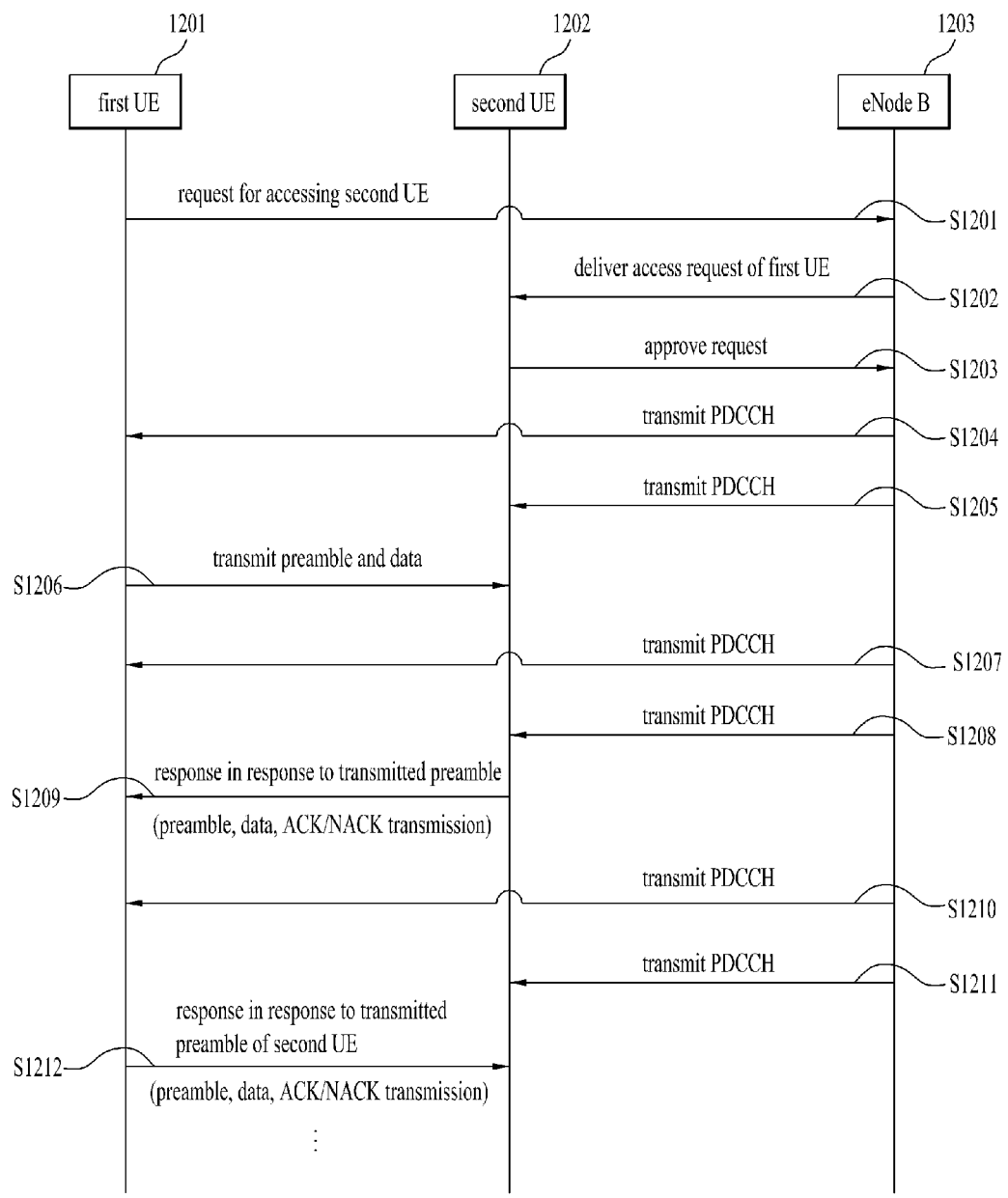
FIG. 12 is a flowchart for explaining a D-to-D communication procedure according to one embodiment of the present invention.

FIG. 12 is a flowchart for explaining a D-to-D communication procedure according to one embodiment of the present invention.

Referring to FIG. 12, a first UE intended to perform a D-to-D communication with a second UE can make a request for accessing the second UE to an eNode B. When the first UE makes a request for the access, the first UE can transmit an identifier of an object for the D-to-D communication, i.e., the second UE together with the request [S1201]. In this case, the access request can be performed by an upper layer signaling or a scheduling request (SR). If the access request is performed by the SR, it may be necessary to have an additional bit capable of informing that the access request corresponds to the D-to-D communication request. Or, the D-to-D communication request can be informed by transmitting the SR using a specific resource.

Having received the access request for accessing the second UE of the first UE, the eNode B delivers the access request to the second UE [S1202]. If the second UE approves the access request of the first UE, the eNode B performs a UE pairing to form a D-to-D link between the first UE and the second UE. The eNode B can inform the first UE and the second UE of the information that the UE pairing is formed. If the second UE is in idle mode in the aforementioned process, the second UE is switched to an RRC_connected state, and then the aforementioned process can be performed. A parameter (resource region, transmission timing, primary/secondary, RX/TX mode, RX/TX switching pattern, ACK/NACK timing, timing adjustment, and the like) configured to transmit information between the paired first UE and the second UE is delivered via an upper layer signaling or PDCCH, which is transmitted to the first and second UE by the eNode B.

Subsequently, after the first UE and the second UE are paired together, the eNode B can transmit PDCCH to each UE [S1204, S1205]. In this case, the PDCCH transmitted to the first UE may correspond to a command to transmit a preamble to the second UE. The preamble is transmitted to the second UE for the first UE to obtain an UL synchronization of the second UE. To this end, a special DCI can be transmitted to the first UE on the PDCCH transmitted to the first UE. This DCI shall be described later. The preamble may correspond to a random access preamble. And, the PDCCH transmitted to the first UE can be transmitted together with uplink allocation information to enable the first UE to transmit a data together with the preamble. The PDCCH transmitted to the second UE by the eNode B may be used for a usage of informing the second UE that the D-to-D communication will be initiated and a preamble and/or a data will be transmitted to the second UE from the first UE. In particular, the first UE tries to transmit a preamble and/or a data in accordance with the UL synchronization of the eNode B using an UL resource allocated by the eNode B. And, since the second UE is not able to know the UL synchronization of the first UE, the second UE is ready to receive a transmission from the first UE in a manner of considering a prescribed time error. Meanwhile, the PDCCH transmitted to the first UE and the second UE is able to inform that the first UE and the second UE are a primary UE of the D-to-D communication and a secondary UE of the D-to-D communication, respectively.

The first UE can transmit the preamble and/or the data on the resource allocated by the eNode B [S1206]. In this case, since the preamble is transmitted to the second UE, the preamble can be transmitted by a pre-set power level. The power level is estimated from a position of the first UE and the second UE, a distance between the first UE and the second UE, and the like when the first UE and the second UE are paired by the eNode B. And, the power level may be transmitted to the first UE via an upper layer signaling and the like. A data transmission from the first UE to the second UE can be performed by PUSCH or PDSCH format of a legacy LTE/LTE-A system or can be performed by a format newly designed for the D-to-D communication.

Since the second UE can anticipate that the first UE paired with the second UE will transmit a preamble and/or a data in a manner of receiving PDCCH from the eNode B, the second UE can successfully receive the preamble and/or the data. A modulation and coding scheme (MCS) used for the transmission may correspond to a pre-set MCS or the MCS checked by the preamble transmitted from the first UE. And, it may correspond to the MCS informed by the eNode B when the eNode B transmits PDCCH to the second UE. The second UE generates a reception confirmation response (ACK/NACK) for the preamble and/or the data.

After transmitting the PDCCH configured to indicate a preamble transmission to the first UE, the eNode B retransmits PDCCH to the first UE and the second UE in a prescribed time (for instance, as described in FIG. 13, in 4 subframes from a subframe where the first UE has transmitted the preamble and/or the data) [S1207, S1208]. In this case, the PDCCH transmitted to the first UE is configured for the first UE, which is not obtained the UL synchronization of the second UE yet, to ready to receive a signal transmitted from the second UE. The PDCCH transmitted to the second UE is configured to indicate the second UE to transmit a preamble to the first UE. The preamble is transmitted to the first UE in order for the second UE to obtain the UL synchronization of the first UE.

Having received the PDCCH from the eNode B, the second UE can transmit a response in response to the preamble transmitted by the first UE in the step S1206 [S1209]. The response may include the preamble transmitted by the second UE to obtain the UL synchronization of the first UE and an ACK/NACK. And, if the second UE has a data to be transmitted to the first UE, the data can be transmitted together with the response. In this case, the ACK/NACK transmission can be piggyback on the data transmission. And, the response can include a timing adjustment value that the first UE can obtain the UL synchronization of the second UE. If the timing adjustment value is included in the response, the first UE can obtain the UL synchronization of the second UE.

Similar to the step S1204 and S1205, in a prescribed time, the eNode B can transmit PDCCH to the first and the second UE, respectively. Having received the PDCCH, the first UE can transmit a preamble configured to obtain the UL synchronization of the second UE again and an ACK/NACK in response to the transmission of the second UE in the step S1209 to the second UE. And, if the first UE has a data to be transmitted to the second UE, the first UE can transmit the data to the second UE. And, the first UE can transmit a timing adjustment value that the second UE can obtain the UL synchronization of the first UE. In this case, if the first UE receives the timing adjustment value from the second UE in the step S1209, since the first UE has already obtained the UL synchronization of the second UE, the preamble configured to obtain the UL synchronization of the second UE again may not be transmitted in some cases. In particular, if the first UE judges that the UL synchronization of the second UE, which is already obtained, can be used as it is since mobility of the first UE is low as a result of considering the mobility (speed, etc.) of the first UE, the preamble configured to obtain the UL synchronization of the second UE again does not need to be transmitted.

Thereafter, the first UE or the second UE intended to end a transmission can transmit an access cancellation request to the eNode B and the eNode B can terminate the D-to-D communication between the first UE and the second UE according to the request. In this case, the access cancellation request can be achieved by an upper layer signaling. Or, instead of the access cancellation request, when the first UE and the second UE initiates the D-to-D communication for the first time, a scheme of informing the available number of transmission of each UE, the available time of transmission of each UE, or the like can be applied.

Figure 13:
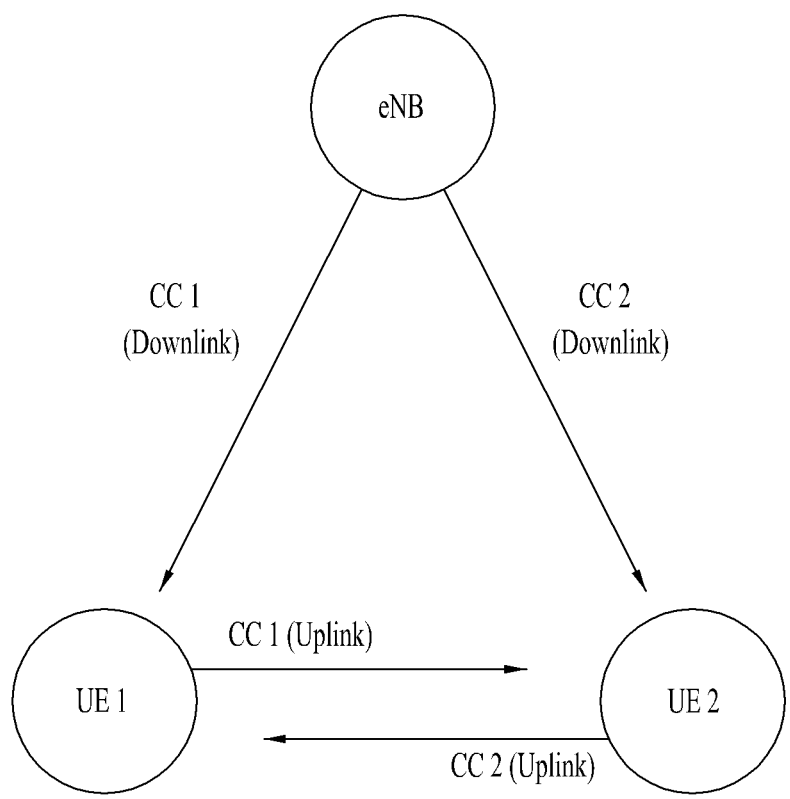
FIG. 13 is a diagram of a PDCCH transmission in a D-to-D communication according to one embodiment of the present invention.

Meanwhile, for the aforementioned steps of D-to-D communication, which UE transmits a signal or which UE receives a signal can be configured to perform according to a pre-set rule. In particular, each of the first UE and the second UE can be configured to perform a transmission and a reception with four subframe intervals (or, with the specific number of slot interval) by turns. Or, such a specific pattern as two transmissions and one reception can be promised in advance. And, the eNode B can skip a PDCCH transmission for a UE performing a receiving operation on a specific time. If a carrier aggregation is applied to the aforementioned explanation, the PDCCH transmitted to both the first UE and the second UE may be transmitted on a CC different from each other as depicted in FIG. 13.

FIG. 14 is a diagram for explaining a D-to-D communication procedure according to one embodiment of the present invention in relation to transmission/reception timing. FIG. 14(a) is an example of 1 HARQ process and FIG. 14(b) is an example of 4 HARQ processes in parallel. In the FIG. 14(a) and FIG. 14(b), detailed contents related to the transmission/reception between the first UE (UE 1) and the second UE (UE 2) are replaced with the explanation on FIG. 12.

Figure 15:
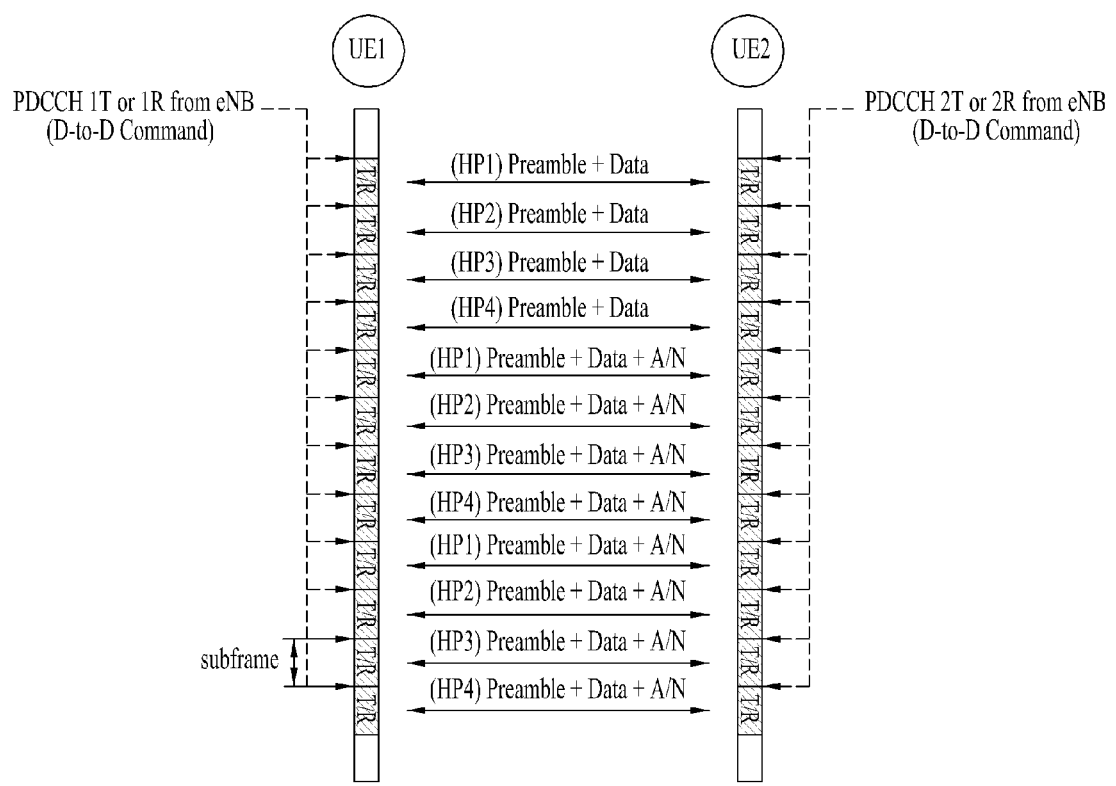
FIG. 15 is a diagram of a D-to-D communication procedure according to a different embodiment of the present invention.

If the first UE (UE 1) and the second UE (UE 2) can simultaneously transmit and receive on an identical band, it is possible to perform a more efficient communication. In this case, the first UE transmits a data to the second UE in a subframe n and the second UE can transmit a data to the first UE at the same time. And, the first UE transmits an ACK/NACK to the second UE in a subframe n+4. If there is a data to be transmitted, the first UE can transmit the data together with the ACK/NACK to the second UE. Similarly, the second UE transmits the ACK/NACK to the first UE in the subframe n+4. If there is a data to be transmitted, the first UE can transmit the data together with the ACK/NACK to the first UE. A resource used by the first UE and the second UE is the resource designated in advance or may correspond to the resource designated by the PDCCH transmitted to each UE. The aforementioned case is depicted in FIG. 15. Referring to FIG. 15, PDCCH 1T and PDCCH 2T correspond to the PDCCH configured for a UE to perform a transmission on a corresponding timing and PDCCH 1R and PDCCH 2R correspond to the PDCCH configured to perform a reception on a corresponding timing. Meanwhile, the PDCCH 1R and the PDCCH 2R may be omitted.

Figure 16:
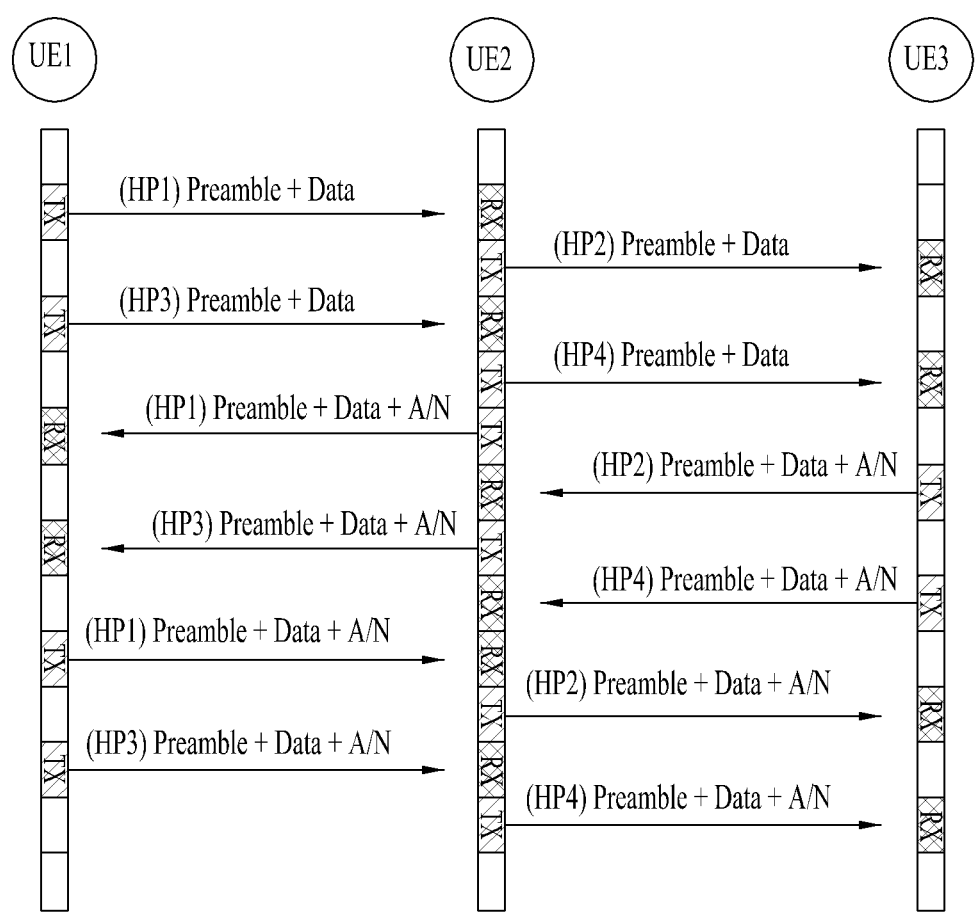
FIG. 16 is a diagram of a D-to-D communication procedure between a plurality of user equipments according to one embodiment of the present invention.

FIG. 16 is a diagram for explaining a D-to-D communication procedure according to one embodiment of the present invention.

Referring to FIG. 16, a plurality of UEs (UE 1, UE 2, and UE 3) performs a D-to-D communication. When a relationship between the first UE (UE 1) and the second UE (UE 2) is examined, it is able to find out that 2 HARQ processes are applied to FIG. 14(a). And, when a relationship between the second UE (UE 2) and a third UE (UE 3) is examined, it is able to find out that 2 HARQ processes are also applied to FIG. 14(a). Detailed contents related to transmission and reception of each UE is replaced with the explanation on FIG. 12 and FIG. 14(a). Yet, in case of the second UE, since there exist 2 cases of reception, i.e., reception from the first UE and reception from the third UE (in case of transmission, transmission to the first UE and transmission to the third UE), it is necessary for the eNode B to inform the second UE of the aforementioned content when the eNode B transmits PDCCH (not depicted). The UEs shown in FIG. 16 may perform transmission and reception on an identical band at the same time similar to the case of FIG. 15 (not depicted). Yet, in order for the UEs to perform the transmission and reception at the same time on an identical band, the UEs should have capability to do so.

Meanwhile, a DCI configured to indicate UEs performing the D-to-D communication to transmit a preamble to a different UE can be used by selecting one of DCIs depicted in FIG. 17(b) to FIG. 17(f). FIG. 17 is a diagram of an example of the DCI according to one embodiment of the present invention. FIG. 17(a) depicts a DCI format 1A currently defined by LTE-A. In this case, a CIF means a carrier indicating field (3 bits), 0/1A means an indicator field indicating whether a current DCI format is 0 or 1A, an L/D means a distributed/concentrated virtual RB assignment flag field, an RA means DL resource allocation, an MCS means a modulation and coding information field, an HARQ means a field for informing the number of process used for a soft combining, an NDI means an indicator field used to empty a buffer for an initial transmission in relation to an HARQ process, an RV means a redundancy version field, a TPC means a transmit power control command field, and a ZP means a zero padding. A current DCI can indicate a UE performing a D-to-D communication to transmit a preamble in a manner of configuring a specific field of the DCI format 1A to be contiguous with such an identical bit as 0 or 1 and may inform an identifier of a UE, which should transmit a preamble in a manner of combining several fields, an MCS, and UL assignment information.

For instance, in case of FIG. 17(b), if the L/D field is 0 and the RA field is filled with contiguous 1s, it indicates that the current DCI commands a UE to transmit a preamble and the DCI can include such information as a PRACH mask index configured to designate a resource for transmitting the preamble, a UE identifier, an MCS, and the like. In this case, the information included in the DCI can be variously configured as shown in FIG. 17(c) to FIG. 17(f). In FIG. 17(b) to FIG. 17(F), although it is depicted that the L/D field is 0 and the RA field is filled with contiguous 1s to inform the UE that the current DCI commands the UE to transmit a preamble, the L/D field and the RA field can be differently configured. In particular, only the RA field may be configured to be filled with contiguous 0s. And, although the aforementioned description is explained on the basis of the DCI format 1A, this is just exemplary. Similarly, various transmission modes can be supported by using a different DCI format.

Figure 18:
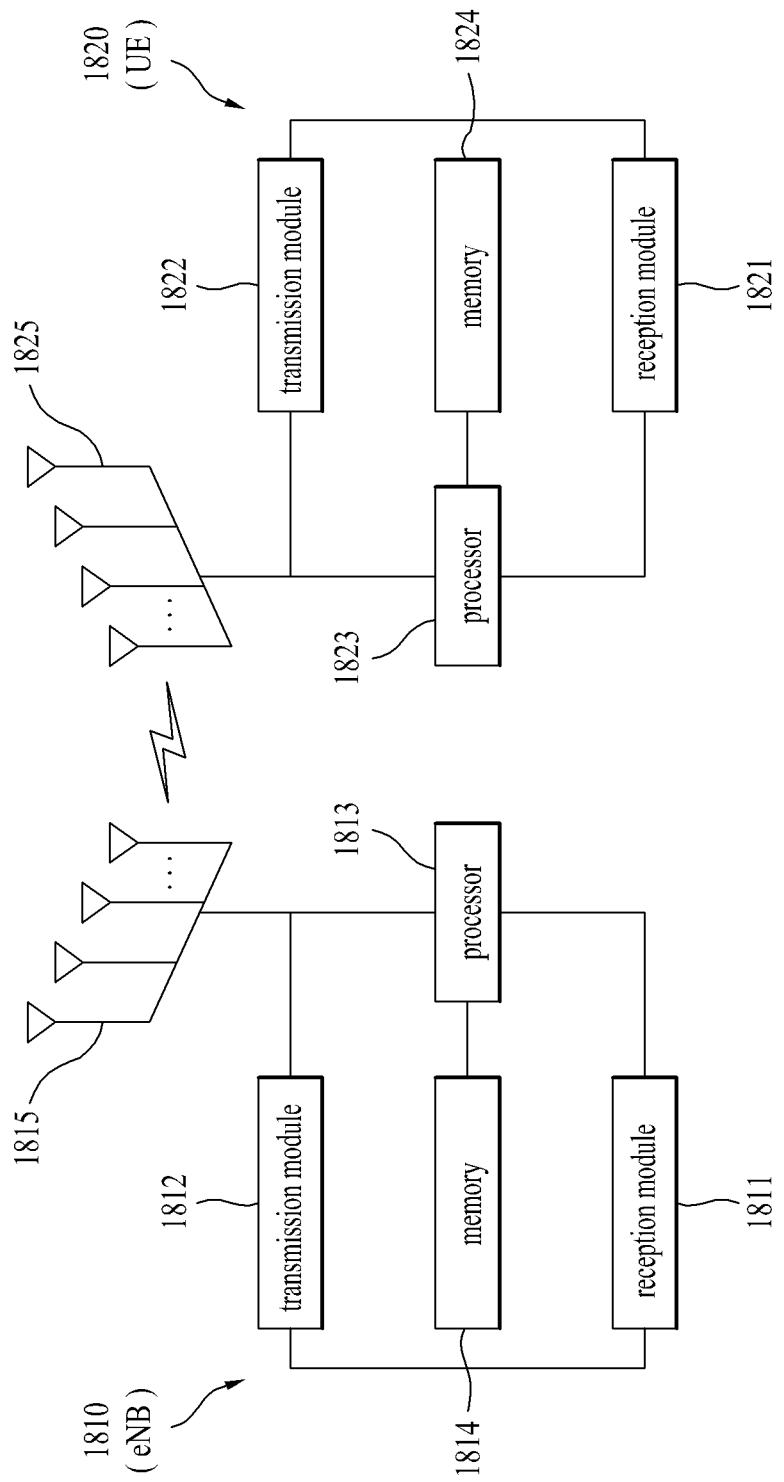
FIG. 18 is a diagram of a configuration of an eNode B device and a user equipment device according to embodiment of the present invention.

FIG. 18 is a diagram of a configuration of an eNode B device and a user equipment device according to embodiment of the present invention.

Referring to FIG. 18, the eNode B 1810 according to the present invention includes a reception module 1811, a transmission module 1812, a processor 1813, a memory 1814, and a plurality of antennas 1815. A plurality of the antennas 1815 means the eNode B capable of supporting MIMO transmission and reception. The reception module 1811 can receive various signals, a data, and information in UL from the UE. The transmission module 1812 can transmit various signals, a data, and information in DL to the UE. The processor 1813 can control overall operations of the eNode B 1810.

The processor 1813 of the eNode B 1810 according to one embodiment of the present invention is configured to receive an access request of the first UE to the second UE and configured to transmit control information for the access request. The control information is used to transmit a preamble to the second UE by the first UE. The preamble may be configured for the first UE to obtain a UL synchronization of the second UE.

Besides, the processor 1813 of the eNode B 1810 is configured to perform a function of processing information received by the eNode B 1810, information to be transmitted to an external, and the like. The memory 1814 is configured to store the processed information for a prescribed time and can be substituted by such a configuration element as a buffer (not depicted), or the like.

Subsequently, referring to FIG. 18, the UE 1820 according to the present invention includes a reception module 1821, a transmission module 1822, a processor 1823, a memory 1824, and a plurality of antennas 1825. A plurality of the antennas 1825 means the UE capable of supporting MIMO transmission and reception. The reception module 1821 can receive various signals, a data, and information in DL from the eNode B. The transmission module 1822 can transmit various signals, a data, and information in UL to the eNode B. The processor 1823 can control overall operations of the UE 1820.

The processor 1823 of the UE B 1820 according to one embodiment of the present invention is configured to make a request for accessing the second UE to an eNode B, configured to receive control information for the request from the eNode B, configured to transmit a preamble to the second UE using the control information, and configured to receive a response from the second UE in response to the preamble. The preamble may be transmitted to the second UE to obtain an UL synchronization of the second UE.

Besides, the processor 1823 of the UE 1820 is configured to perform a function of processing information received by the UE 1820, information to be transmitted to an external, and the like. The memory 1824 is configured to store the processed information for a prescribed time and can be substituted by such a configuration element as a buffer (not depicted), or the like.

Detail configuration of the eNode B and the UE can be implemented to independently apply the aforementioned contents explained in various embodiments of the present invention or to simultaneously apply two or more embodiments. The overlapped contents are omitted for clarity of explanation.

And, in explaining FIG. 18, explanation on the eNode B 2610 can be identically applied to a device as a main agent of DL transmission or a main agent of UL reception. Explanation on the UE 1820 can be identically applied to a relay as a main agent of DL reception or a main agent of UL transmission.

Embodiments of the present invention can be implemented using various means. For instance, embodiments of the present invention can be implemented using hardware, firmware, software and/or any combinations thereof.

In the implementation by hardware, a method according to each embodiment of the present invention can be implemented by at least one selected from the group consisting of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, a method according to each embodiment of the present invention can be implemented by modules, procedures, and/or functions for performing the above-explained functions or operations. Software code is stored in a memory unit and is then drivable by a processor. The memory unit is provided within or outside the processor to exchange data with the processor through the various means known in public.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

The above-described embodiments correspond to combinations of elements and features of the present invention in prescribed forms. And, the respective elements or features may be considered as selective unless they are explicitly mentioned. Each of the elements or features can be implemented in a form failing to be combined with other elements or features. Moreover, it is able to implement an embodiment of the present invention by combining elements and/or features together in part. A sequence of operations explained for each embodiment of the present invention can be modified. Some configurations or features of one embodiment can be included in another embodiment or can be substituted for corresponding configurations or features of another embodiment. And, it is apparently understandable that an embodiment is configured by combining claims failing to have relation of explicit citation in the appended claims together or can be included as new claims by amendment after filing an application.

INDUSTRIAL APPLICABILITY

Although the aforementioned explanation describes the present invention in a manner of mainly concerning a form applied to a 3GPP LTE mobile communication system, the present invention can be used for various kinds of mobile communication systems with an identical or an equivalent principle.

What is claimed is:

1. A method of transmitting a signal to a second user equipment, which is transmitted by a first user equipment in a wireless communication system, the method comprising:
   transmitting, by the first user equipment, a request for accessing the second user equipment to an eNode B through a first component carrier;
   receiving, by the first user equipment, a first control information on the request from the eNode B through the first component carrier,
   wherein the second user equipment receives a second control information from the eNode B through a second component carrier;
   transmitting, by the first user equipment, a preamble to the second user equipment using the first control information through the first component carrier; and
   receiving, by the first user equipment, a response from the second user equipment in response to the preamble through the second component carrier,
   wherein the preamble is transmitted by the first user equipment to obtain an uplink synchronization of the second user equipment, and
   wherein the first component carrier and the second component carrier include a carrier frequency different from each other based on a carrier aggregation.

2. The method of claim 1, further comprising:
   transmitting a reception confirmation response to the second user equipment in response to the response, wherein the first user equipment is configured to transmit a preamble to the second user equipment to obtain the uplink synchronization of the second user equipment again when the reception confirmation response is transmitted to the second user equipment.

3. The method of claim 1, further comprising:
   transmitting a reception confirmation response to the second user equipment in response to the response, wherein if mobility of the first user equipment is greater than a pre-set value, a preamble configured to obtain the uplink synchronization of the second user equipment again is transmitted together with the reception confirmation response when the reception confirmation response is transmitted to the second user equipment.

4. The method of claim 1, wherein the first control information is transmitted on a physical downlink control channel (PDCCH), and
   wherein the PDCCH comprises a downlink control information configured to indicate the first user equipment to transmit the preamble.

5. The method of claim 4, wherein the downlink control information comprises at least one selected from the group consisting of an uplink resource allocation, a modulation and coding rate, an identifier of the second user equipment.

6. The method of claim 4, wherein the downlink control information further comprises a virtual resource block assignment indicator field and a resource block assignment field, wherein the virtual resource block assignment field is set to 0, and wherein the resource block assignment field is set to identical contiguous bits.

7. The method of claim 1, wherein the access request comprises an identifier of the second user equipment.

8. The method of claim 1, wherein the preamble comprises a random access preamble.

9. The method of claim 1, wherein the first user equipment is configured to transmit a data together with the preamble to the second user equipment when the preamble is transmitted to the second user equipment.

10. The method of claim 1, wherein the response comprises a reception confirmation response in response to the transmitted preamble and a preamble transmitted by the second user equipment to obtain an uplink synchronization of the first user equipment.

11. The method of claim 10, wherein the response comprises a data transmitted to the first user equipment by the second user equipment.

12. A method of receiving a signal from a first user equipment, which is received by a second user equipment in a wireless communication system, the method comprising:
   receiving, by the second user equipment, a first control information from an eNode B through a first component carrier;
   receiving, by the second user equipment, a preamble transmitted by the first user equipment,
   wherein the first user equipment transmits a request for accessing the second user equipment through a second component carrier; and
   transmitting, by the second user equipment, a response to the first user equipment in response to the preamble through the first component carrier,
   wherein the preamble is transmitted by the first user equipment to obtain an uplink synchronization of the second user equipment, and
   wherein the first component carrier and the second component carrier include a carrier frequency different from each other based on a carrier aggregation.

13. An eNode B in a wireless communication system, the eNode B comprising:
  a reception module;
  a transmission module; and
  a processor operably coupled to the reception module and the transmission module,
  wherein the processor is configured to:
  receive a request for accessing a second user equipment from a first user equipment through a first component carrier, and
  transmit a first control information to the first user equipment through the first component carrier and a second control information to the second user equipment through a second component carrier based on the request,
  wherein the first control information is used for the first user equipment to transmit a preamble to the second user equipment through the first component carrier,
  wherein the preamble is configured for the first user equipment to obtain an uplink synchronization of the second user equipment,
  wherein the second control information is used for the second user equipment to transmit a response to the first user equipment through the second component carrier in response to the preamble, and
  wherein the first component carrier and the second component carrier include a carrier frequency different from each other based on a carrier aggregation.

14. A first user equipment for transmitting a signal to a second user equipment in a wireless communication system, the first user equipment comprising:
  a reception module;
  a transmission module; and
  a processor operably coupled to the reception module and the transmission module,
  wherein the processor is configured to:
  transmit a request for accessing the second user equipment to an eNode B through a first component carrier, and
  receive a first control information on the request from the eNode B through the first component carrier,
  wherein the second user equipment receives a second control information from the eNode B through a second component carrier,
  transmit a preamble to the second user equipment using the control information through the first component carrier,
  receive a response from the second user equipment in response to the transmitted preamble through the second component carrier,
  wherein the preamble is transmitted to obtain an uplink synchronization of the second user equipment, and
  wherein the first component carrier and the second component carrier include a carrier frequency different from each other based on a carrier aggregation.

15. A second user equipment for receiving a signal from a first user equipment in a wireless communication system, the second user equipment comprising:
  a transmission module;
  a reception module; and
  a processor operably coupled to the reception module and the transmission module,
  wherein the processor is configured to:
  receive a first control information from an eNode B through a first component carrier,
  receive a preamble transmitted by the first user equipment, which transmitted a request for accessing the second user equipment through a second component carrier; and
  transmit a response to the first user equipment in response to the preamble through the first component carrier,
  wherein the preamble is transmitted by the first user equipment to obtain an uplink synchronization of the second user equipment, and
  wherein the first component carrier and the second component carrier include a carrier frequency different from each other based on a carrier aggregation.

* * * * *